US010802350B2

(12) United States Patent
Shioaku et al.

(10) Patent No.: US 10,802,350 B2
(45) Date of Patent: Oct. 13, 2020

(54) DISPLAY DEVICE

(71) Applicant: Sharp Kabushiki Kaisha, Sakai, Osaka (JP)

(72) Inventors: Yoshihiro Shioaku, Sakai (JP); Yuta Senokuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/326,724

(22) PCT Filed: Aug. 17, 2017

(86) PCT No.: PCT/JP2017/029522
§ 371 (c)(1),
(2) Date: Feb. 20, 2019

(87) PCT Pub. No.: WO2018/037988
PCT Pub. Date: Mar. 1, 2018

(65) Prior Publication Data
US 2019/0196243 A1    Jun. 27, 2019

(30) Foreign Application Priority Data

Aug. 23, 2016   (JP) .............................. 2016-162587

(51) Int. Cl.
*G02F 1/1339*         (2006.01)
*G02F 1/1335*         (2006.01)
(Continued)

(52) U.S. Cl.
CPC ........ *G02F 1/13394* (2013.01); *G02F 1/1339* (2013.01); *G02F 1/13439* (2013.01);
(Continued)

(58) Field of Classification Search
CPC ............... G02F 1/13394; G02F 1/1339; G02F 1/136286; G02F 1/1368; G02F 1/133514;
(Continued)

(56) References Cited

U.S. PATENT DOCUMENTS

2009/0290117 A1* 11/2009  Watanabe ............. G02F 1/1339
                                                              349/153
2014/0022478 A1*  1/2014  Kim ...................... G02F 1/1339
                                                               349/43
2017/0227804 A1*  8/2017  Nagasawa ........... G02F 1/13394

FOREIGN PATENT DOCUMENTS

JP         10-319440 A     12/1998
JP         2000-75257 A     3/2000
(Continued)

OTHER PUBLICATIONS

Official Communication issued in International Patent Application No. PCT/JP2017/029522, dated Nov. 7, 2017.

*Primary Examiner* — Angela K Davison
(74) *Attorney, Agent, or Firm* — Keating & Bennett, LLP

(57) ABSTRACT

A liquid crystal panel includes two substrates, an outer light-shielding portion, an inner light-shielding portion, and spacers. The substrates are bonded to each other. The outer light-shielding portion is disposed outer than an outer periphery of area display area in which an image is displayed between the substrates. The inner light-shielding portion is disposed inner than an inner periphery of the display area between the substrates. The spacers are disposed between the substrates. The spacers include outer spacers and at least one inner spacer. The outer spacers are disposed to overlap the outer light-shielding portion. The at least one inner spacer is disposed to overlap the inner light-shielding portion.

6 Claims, 16 Drawing Sheets

(51) Int. Cl.
*G02F 1/1343* (2006.01)
*G02F 1/1333* (2006.01)

(52) U.S. Cl.
CPC .. *G02F 1/133514* (2013.01); *G02F 1/133512* (2013.01); *G02F 2001/13396* (2013.01); *G02F 2001/133388* (2013.01); *G02F 2201/56* (2013.01)

(58) Field of Classification Search
CPC ..... G02F 1/133512; G02F 2001/13396; G02F 2201/56; B60K 37/02; B60K 2370/152; B60K 2370/1523
See application file for complete search history.

(56) References Cited

FOREIGN PATENT DOCUMENTS

| | | |
|---|---|---|
| JP | 2001-133787 A | 5/2001 |
| JP | 2010-139657 A | 6/2010 |
| WO | 2012/039342 A1 | 3/2012 |

* cited by examiner

DISPLAY DEVICE

TECHNICAL FIELD

The present invention relates to a display device.

BACKGROUND ART

Examples of currently-known liquid crystal display devices include one described in Patent Literature 1 as under. The liquid crystal display device described in Patent Document 1 includes a gap retaining member between a pixel region and a drive circuit region for controlling a cell gap, thereby obtaining a uniform cell thickness.

RELATED ART DOCUMENT

Patent Document
Patent Document 1: Japanese Unexamined Patent Publication No. H10-319440A Problem to be Solved by the Invention However, the display device described in the above Patent Literature 1 includes spacers disposed only at an outer portion of the pixel region. Consequently, an insufficient arrangement space of the spacers may lead to an unsatisfied retaining force of a gap between substrates. On the other hand, a larger arrangement space of the spacers is needed for obtaining a satisfied retaining force, which may lead to a large frame width. In contrast to this, when the spacers are arranged within the pixel region, an aperture ratio of pixels may be lowered, leading to prevention of high definition.

DISCLOSURE OF THE PRESENT INVENTION

The present invention has been made regarding the state of the art noted above, and its object is to obtain an enhanced retaining force of a gap between substrates or a narrowed frame as well as to avoid a lowered aperture ratio.

Means for Solving the Problem

A display device according to one embodiment of the present invention includes two substrates bonded to each other, an outer light-shielding portion, an inner light-shielding portion, and spacers. The outer light-shielding portion is disposed outer than a display area in which an image is displayed between the substrates. The inner light-shielding portion is disposed inner than the display area between the substrates. The spacers are disposed between the substrates. The spacers include outer spacers disposed to overlap the outer light-shielding portion and at least one inner spacer disposed to overlap the inner light-shielding portion.

With such a configuration, the image is displayed in the display area between the outer light-shielding portion and the inner light-shielding portion between the substrates. The outer spacers and the inner spacers included in the spacers are disposed between the substrates to maintain a gap between the substrates. The gap between the substrates is maintained with the outer spacers and the at least one inner spacer in an area outer than the display area and an area inner than the display area, respectively. This configuration is preferable for increasing a retaining force to maintain the gap between the substrates or decreasing the frame width. Moreover, the outer spacers and the inner spacers included in the spacers, which may be light blocking objects, are disposed to overlap the outer light-shielding portion and the inner light-shielding portion, respectively. Consequently, the aperture ratio in the display area is less likely to be reduced. According to the configuration, luminance of the image displayed in the display area can be increased or power consumption can be reduced. Namely, this configuration is preferable for achieving high definition in the display area.

The following configuration is preferred for the embodiment of the present invention.

(1) The spacers are not disposed in at least the display area. The spacers, which may be the light-shielding objects, are not disposed in at least the display area as described above, thereby ensuring prevention of a lowered aperture ratio in the display area caused by the spacers.

(2) The substrates include through holes. The inner light-shielding portion surrounds the through holes. With such a configuration, periphery portions of the through holes formed in the substrates are suitably shielded by the inner light-shielding portion.

(3) Provided are an outer sealing portion, and an inner sealing portion. The outer sealing portion are disposed between the substrates to seal a space between the substrates and to overlap the outer light-shielding portion. The inner sealing portion is disposed between the substrates to seal the space between the substrates and to overlap the inner light-shielding portion. The outer spacers are disposed to overlap the outer sealing portion, and the inner spacers are disposed to overlap the inner sealing portion. With the outer sealing portion and the inner sealing portion disposed between the substrates, the space between the substrates are sealed. Moreover, the outer spacers and the inner spacers are disposed to overlap the outer sealing portion and the inner sealing portion, respectively. Consequently, space to arrange the outer spacers and space to arrange the inner spacers can be reduced. This is an advantage for reducing the width of the frame.

(4) Each of the substrates has a plate-shape with no opening. The inner light-shielding portion is disposed to overlap at least a center of the substrates. With such a configuration, the inner light-shielding portion shields a portion around the center of the plate-shaped substrates with no opening.

(5) Provided is a sealing portion that is disposed between the substrates to seal a space between the substrates and to overlap the outer light-shielding portion. The outer spacers are disposed to overlap the sealing portion. With the sealing portion disposed between the substrates, the space between the substrates is sealed from the outer side. Moreover, the outer spacers are disposed on the sealing portion. Consequently, a space to arrange the outer spacers can be reduced. This is an advantage for reducing the width of the frame.

(6) The inner spacer is disposed concentrically with the substrates. The portion around the center of the paired substrates is most likely to deform when an external force is applied. On the other hand, the inner spacer is disposed concentrically with the center of the substrates as described above. This leads to difficulty in deformation of the substrates even when the external force is applied, thereby obtaining a higher retaining force between the substrates.

(7) The display area includes pixels. One of the substrates includes a color section that colors the pixels, an outer color section disposed in a layer in which the color section is disposed to overlap the outer spacers, and an inner color section disposed in the layer in which the color section is disposed to overlap the at least one inner spacer. With such a configuration, a height of the outer spacers can be reduced by a thickness of the outer color section that overlaps the outer spacers. In addition, a height of the inner spacers can be reduced by a thickness of the inner color section that overlaps the inner spacers. In addition, the outer color section overlaps the outer light-shielding portion in addition to the outer spacers. The color section overlaps the inner light-shielding portion in addition to the inner spacers. Therefore, the outer color section and the inner coloring section are less likely to be viewed.

(8) The display area includes pixels. One of the substrates includes electric lines having widths less than outer dimensions of the outer spacers and the at least one inner spacer, the electric lines being connected to the pixels. To define the outer dimensions of the outer spacers and the inner spacers, the minimum dimensions for effectively producing the retaining force to retain the gap between the substrates need to be considered. In contrast to this, when the definition of the display device becomes so high that the line width of the wiring part connected to the pixels is smaller than the outer dimensions of the outer spacers and the inner spacers, the spacers may become light blocking objects, resulting in a decrease in aperture ratio of the pixels even if the spacers are disposed within the display area to overlap the electric lines. On the other hand, when the outer spacers and the inner spacers are disposed to overlap the outer light-shielding portion and the inner light-shielding portion, respectively, as described above, the aperture ratio of the pixels is less likely to be decreased even when the definition of the display device becomes so high that the widths of the electric lines connected to the pixels are smaller than the outer dimensions of the outer spacers and the inner spacers. Accordingly, such provision as above is an advantage for obtaining the high definition.

(9) The at least one inner spacers has a total cross-sectional area in a plan view less than a total cross-sectional area of the outer spacers in the plan view. According to the configuration, the inner light-shielding portion on which the inner spacers are disposed is smaller than the outer light-shielding portion on which the outer spacers are disposed. The width of the frame located inner than the display area can be reduced. Consequently, higher display quality can be achieved.

Advantageous Effect of the Invention

According to the embodiments of the present invention, the enhanced retaining force of the gap between the substrates or the narrowed frame is obtainable, and the lowered aperture ratio is preventable.

BEST MODE FOR CARRYING OUT THE INVENTION

First Embodiment

Figure 1:
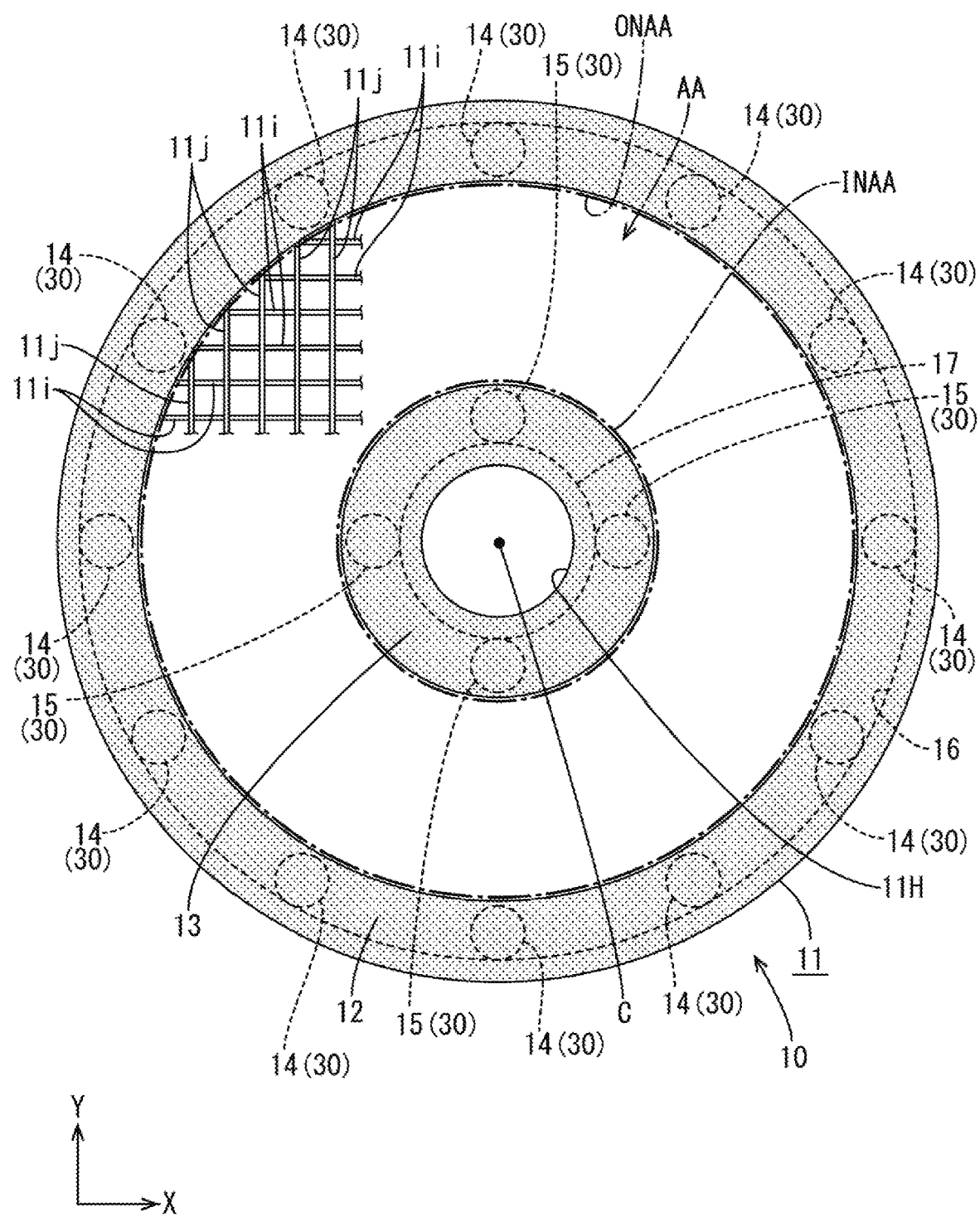
FIG. 1 is a schematic plan view of an internal configuration of a liquid crystal panel provided in a liquid crystal display device according to a first embodiment of the present invention.

The following describes a first embodiment of the present invention with FIGS. 1 to 5. The present embodiment exemplarily describes a liquid crystal display device 10 provided with a liquid crystal panel 11 as a display panel. Note that each of drawings partially indicates an X-axis, a Y-axis, and a Z-axis, each of which corresponds to the direction where the drawing is illustrated.

The liquid crystal display device 10 is substantially circular in its entirety. As illustrated in FIG. 1, the liquid crystal display device 10 includes at least a liquid crystal panel (display device, display panel) 11 that is capable of displaying an image, and a back-light device (illuminating device) as an external light source that is disposed on a backside of the liquid crystal panel 11 and illuminates the liquid crystal panel 11 with light for display. The following describes in detail the liquid crystal panel 11 for a component of the liquid crystal display device 10. However, other components such as the back-light device are well known, and thus the detailed description thereof is to be omitted. Moreover, it is preferred that the liquid crystal display device 10 according to the present embodiment is used for a wearable terminal such as a smartwatch. However, this is not necessarily limitative.

As illustrated in FIG. 1, the liquid crystal panel 11 is substantially circular in its entirety in plan view. The liquid crystal panel 11 has an opening 11H passing through the center C of a screen, and accordingly a planar shape thereof is annular (toroidal) in its entirety. Consequently, an outer non-display area ONAA disposed at an outer side of the liquid crystal panel 11 and an inner non-display area INAA disposed at an inner side of the liquid crystal panel 11 to surround the opening 11 are set as a non-display area (a non-active area) where no image is displayed on the screen of the liquid crystal panel 11. Moreover, an annular area between the outer non-display area ONAA and the inner non-display area INAA on the screen of the liquid crystal panel 11 is defined as a display area (an active area) AA where an image is displayed. Note that FIG. 1 illustrates boundaries of the outer non-display area ONAA, the inner non-display area INAA, and the display area AA by alternate long and short dashed lines. The outer non-display area ONAA and the inner non-display area INAA each have a frame shape whose width dimension is sufficiently smaller than that of the display area AA. Among them, the inner non-display area INAA surrounds the opening 11H of the liquid crystal panel 11, and is annular (endless annular) in a planar shape. The outer non-display area ONAA is annular along an outer end face of the liquid crystal panel 11, and is similar to the inner non-display area INAA in planar shape. The liquid crystal panel 11 is capable of displaying an image on the display area AA with light from the back-light device, and a frontside thereof is defined as a light emission side. FIG. 1 further illustrates the center C of the liquid crystal panel 11.

Figure 4:
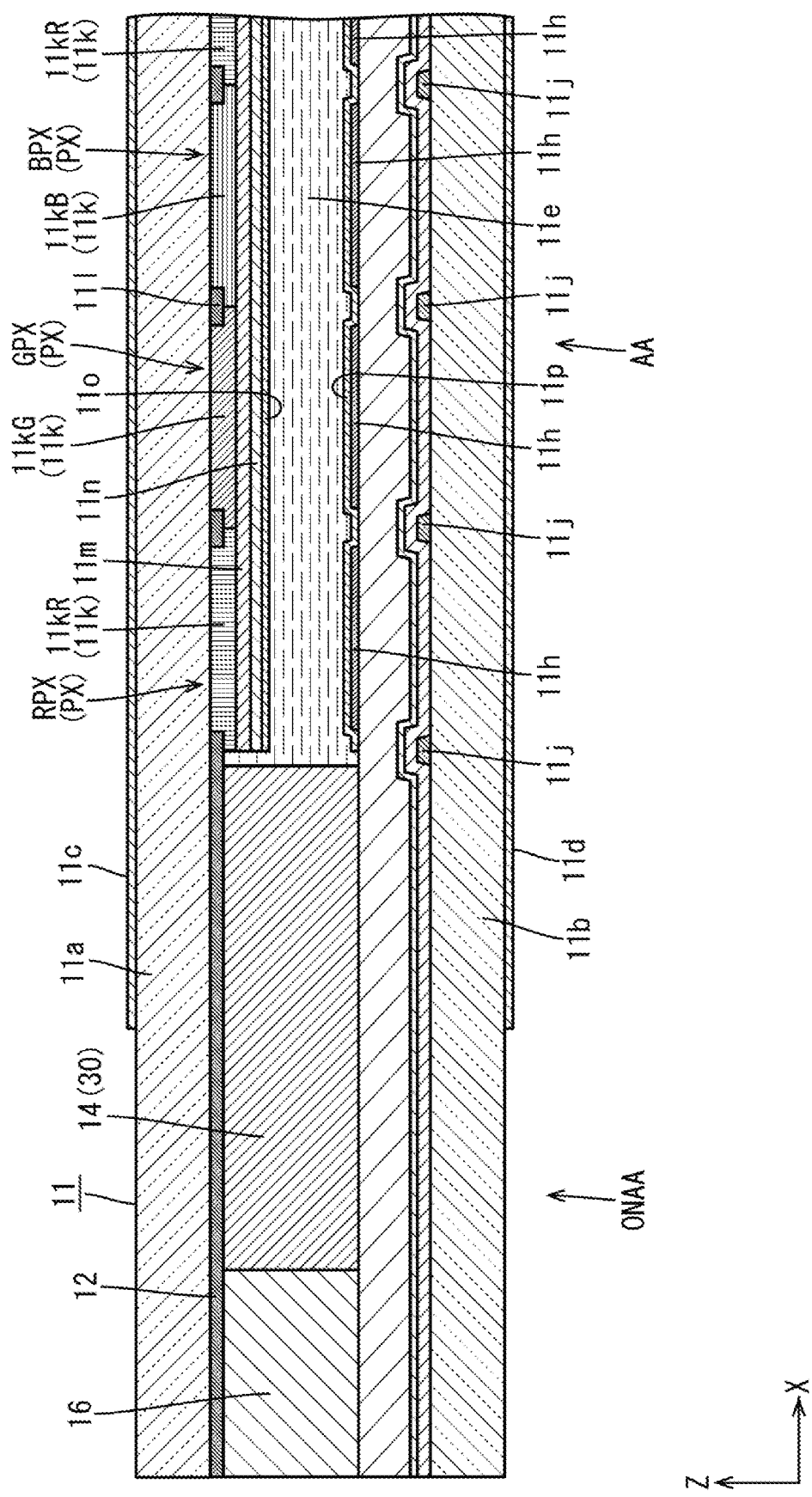
FIG. 4 is a sectional view of an outer side of the liquid crystal panel.
Figure 5:
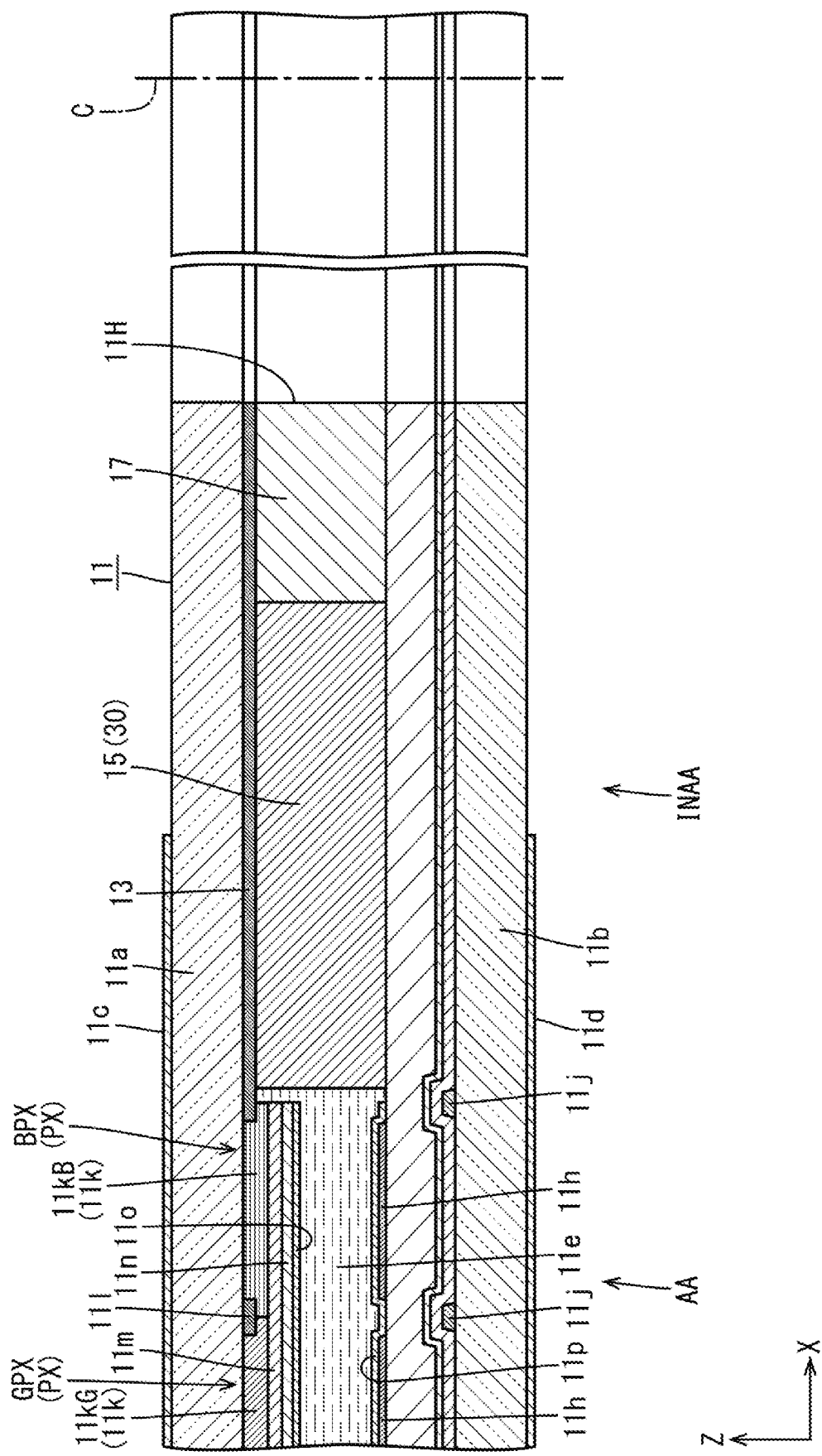
FIG. 5 is a sectional view of an inner side of the liquid crystal panel.

As illustrated in FIGS. 4 and 5, the liquid crystal panel 11 includes at least paired glass substrates 11a, 11b that are substantially transparent with high translucency, and a liquid crystal layer 11e between the paired substrates 11a, 11b and containing liquid crystal molecules (liquid crystal material) whose optical property is variable depending on electric field application. A surface side (front side) one of the paired substrates 11a, 11b that form the liquid crystal panel 11 is referred to as a CF substrate 11a, whereas a rear side (backside) one thereof is referred to as an array substrate (display substrate) 11b. Polarizers 11c, 11d adhere to outer faces of the paired substrates 11a, 11b, respectively. The opening 11H described above is configured such that the paired substrates 11a, 11b and the paired polarizers 11c, 11d pass therethrough. FIG. 5 further illustrates the center C of the liquid crystal panel 11 by alternate long and short dashed lines.

Figure 2:
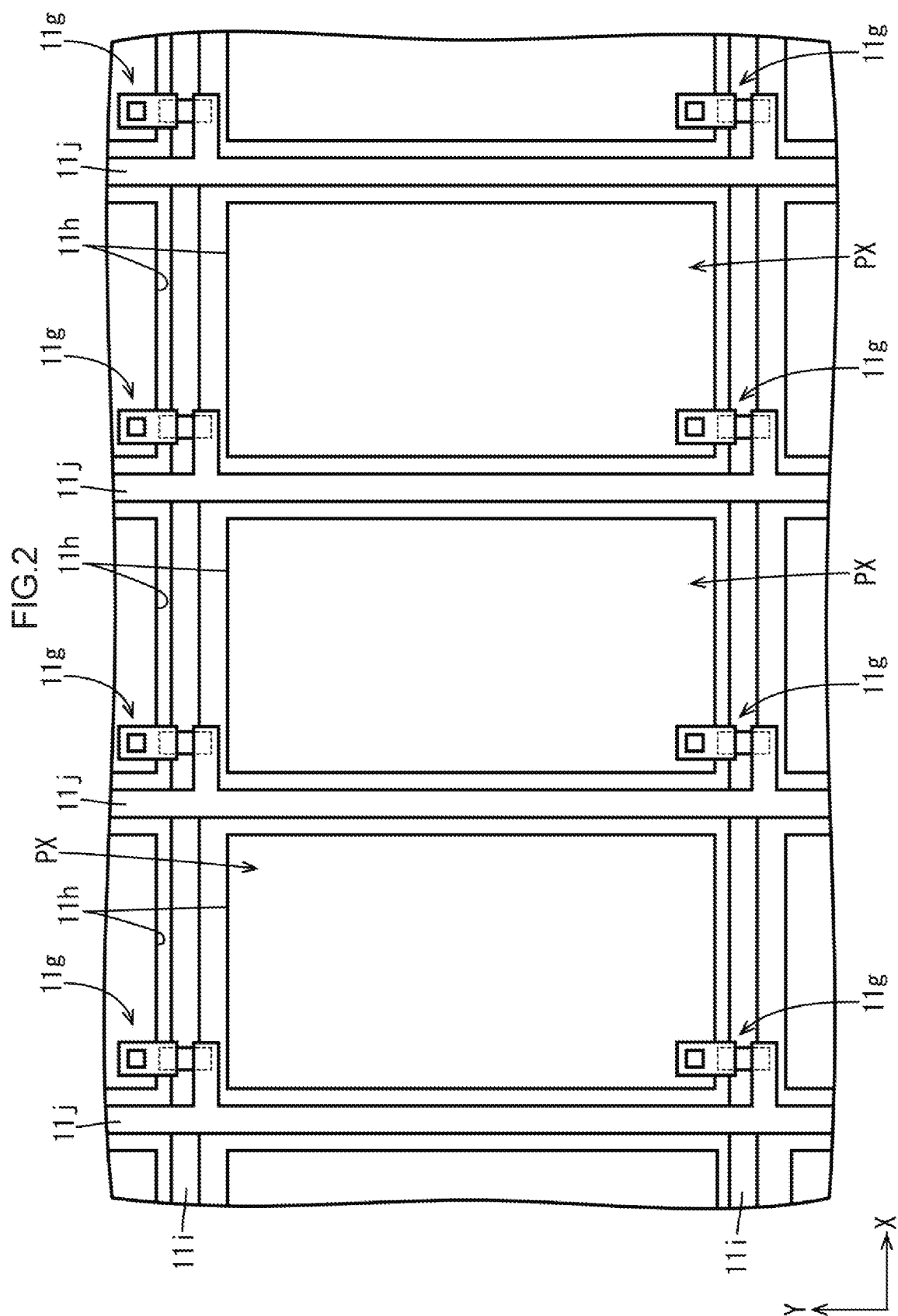
FIG. 2 is a plan view of a pixel construction in an array substrate that forms the liquid crystal panel.

As illustrated in FIG. 2, multiple thin film transistors (TFT: display element) 11g as switching elements and multiple pixel electrodes 11h are arranged in a matrix array (in a row and column manner) at an interior side of the display area AA of the array substrate 11b (a liquid crystal layer 11e side, an opposite side of the CF substrate 11a). In addition, gate lines (scanning lines, a wiring part) 11i and source lines (data lines, a wiring part) 11j surround the TFTs 11g and the pixel electrodes 11h. The gate lines 11i and the source lines 11j are connected to the gate electrodes and the source electrodes of the TFTs 11g, respectively. The pixel electrodes 11h are connected to drain electrodes of the TFTs 11g. Moreover, the TFTs 11g are driven in accordance with various signals supplied to the gate lines 11i and the source lines 11j. In association with the drive, supply of electric potential to the pixel electrodes 11h is controlled. The TFTs 11g each have a channel that connects the drain electrodes and the source electrodes individually. The channel is formed by a semiconductor device film such as an oxide semiconductor material. The oxide semiconductor material that forms the channel has an electron mobility higher than an amorphous silicon material by approximately 20 to 50 times, for example. This achieves easy reduction in size of the TFTs 11g and a maximized quantity of light transmission of the pixel electrodes 11h (an aperture ratio of pixels OX), which is an advantage for obtaining high definition and lowered power consumption. The pixel electrodes 11h are arranged in rectangular regions surrounded by the gate lines 11i and the source lines 11j. The pixel electrodes 11h are made from a transparent electrode material such as indium tin oxide (ITO). In each of the drawings in the present embodiment, an extending direction of the gate lines 11i corresponds to the X-axis direction, a direction orthogonal to the extending direction of the gate lines 11i and an extending direction of the source lines 11j correspond to the Y-axis direction. Now FIG. 1 partially illustrates the gate lines 11i and the source lines 11j as a component within the display area AA.

Figure 3:
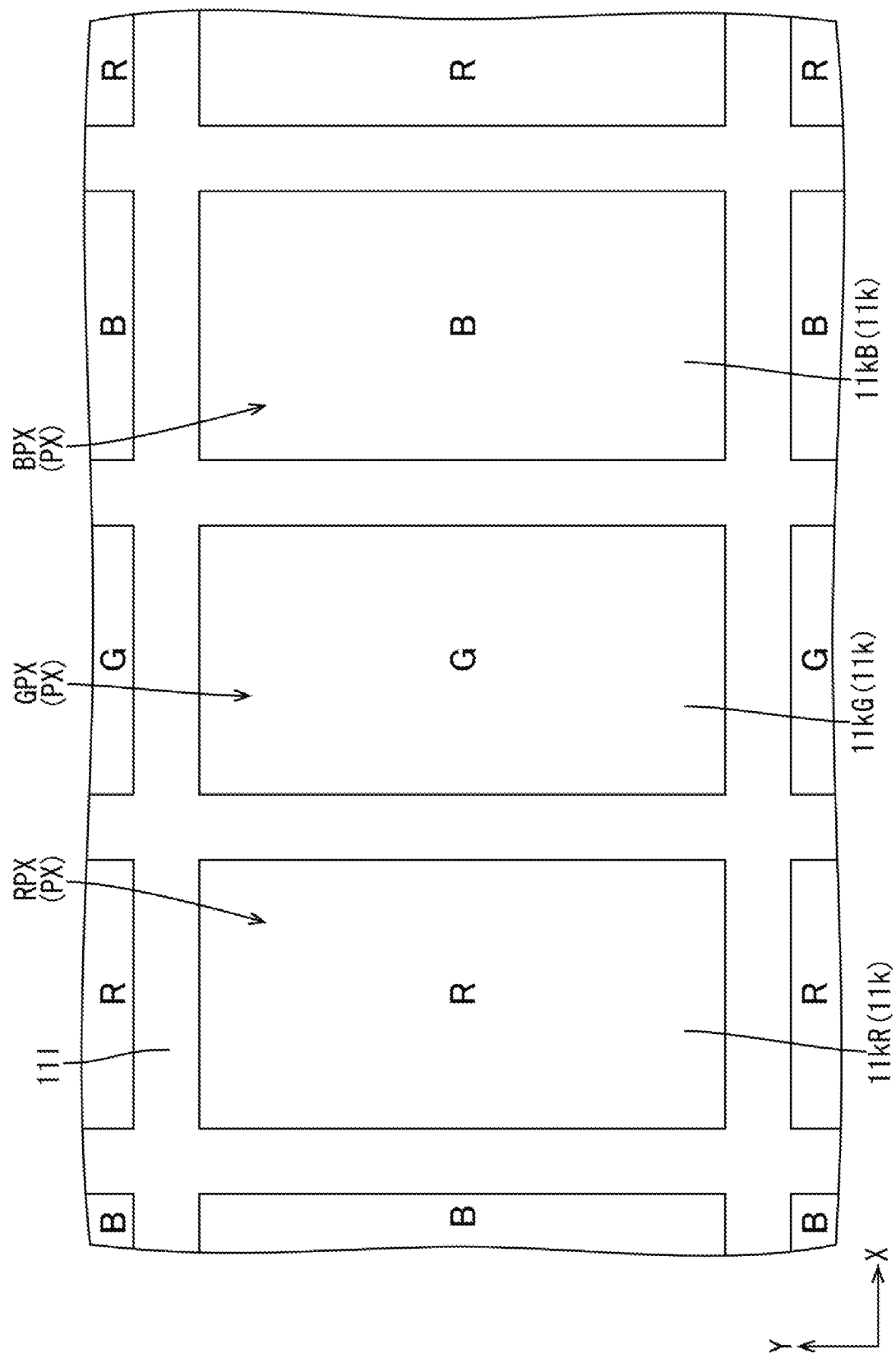
FIG. 3 is a plan view of a pixel construction in a color filter (CF) substrate that forms the liquid crystal panel.

In contrast to this, as illustrated in FIG. 3, the display area AA of the CF substrate 11a includes at the interior side thereof color filters (color sections) with three colors of read (R), green (G), and blue (B) for coloring the pixels PX. Note that if distinction is made among the color filters 11k, an index "R" is applied to the numeral of the red one, an index "G" to the numeral of the green one, and an index "B" to the numeral of the blue one. If no distinction is made among the color filters 11k and a general term is used, no index is applied to the numerals. The multiple color filters 11k are arranged in a row and column manner (in a matrix array) in the X-axis direction and the Y-axis direction that are orthogonal to each other. The color filters 11k adjacent to one another in the X-direction have different colors, whereas the color filters 11k adjacent to one another in the Y-direction have the same color. The color filters 11k arranged in the row and column manner overlap the pixel electrodes 11h adjacent to the array substrate 11b in plan view. The color filter 11k and the pixel electrode 11h that overlap each other form one pixel PX. The pixels PX include three colors, i.e., a read pixel RPX of the red color filter 11kR, a green pixel GPX of the green color filter 11kG, and a blue pixel BPX of the blue color filter 11kB. The three-colored (three) pixels RPX, GPX, BPX arranged in the X-axis direction form one display pixel for color display with predetermined gradation. The display pixel is repeatedly arranged in the X-axis direction on a plate surface of the liquid crystal panel 11. This forms a plurality of pixel groups that are arranged in the Y-axis direction.

As illustrated in FIG. 3, an inter-pixel light-shielding portion (black matrix) 11l is provided at the interior side of the display area AA of the CF substrate 11a so as to divide the adjacent color filters 11k. The inter-pixel light-shielding portion 11l is formed by a light-shielding material (e.g., titanium (Ti)) in a substantially grid shape. The inter-pixel light-shielding portion 11l overlaps the gate lines 11i and the source lines 11j in plan view. Consequently, the inter-pixel light-shielding portion 11l shields spaces between the pixels PX adjacent to one another in the X-axis direction and the Y-axis direction, leading to prevention of color mixture of the pixels PX with different colors that are arranged in the X-axis direction or intensity variation among the pixels PX with the same color that are arranged in the Y-direction. Accordingly, independent display is ensured mutually. A flat overcoat film 11m overlaps the color filters 11k and the inter-pixel light-shielding portion 11l at the interior side. On a surface of the flat overcoat film 11m, a flat counter electrode 11n is overlapped so as to face the pixel electrodes 11h adjacent to the array substrate 11b. The counter electrode 11n is formed by a transparent electrode material such as an indium tin oxide (ITO), which is similar to the pixel electrodes 11h. The counter electrode 11n is always kept with constant reference electric potential. Consequently, when the pixel electrodes 11h connected to the TFTs 11g are charged in association with the drive of the TFTs 11g, a potential difference is generated from the pixel electrodes 11h. Then, variation in alignment condition of the liquid crystal molecule contained in the liquid crystal layer 11e occurs due to the potential difference between the counter electrode 11n and the pixel electrodes 11h, and accordingly, variation in polarized light condition of the transmitted light occurs. As a result, a quantity of light transmission of the liquid crystal panel 11 is controlled individually for each of the pixels PX and a predetermined colored image is to be displayed. In addition, alignment layers 11o, 11p are formed between the substrates 11a, 11b for alignment of the liquid crystal molecules contained in the liquid crystal layer 11e.

Subsequently, the following describes a configuration of the interior sides of the non-display areas ONAA, INAA of the paired substrates 11a, 11b. As illustrated in FIGS. 1 and 4, the outer light-shielding portion 12 on the same layer as the inter-pixel light-shielding portion 11l is provided in the outer non-display area ONAA of the CF substrate 11a. In contrast to this, the inner light-shielding portion 13 on the same layer as the inter-pixel light-shielding portion 11l and the outer light-shielding portion 12 is provided in the inner non-display area INAA. The outer light-shielding portion 12 and the inner light-shielding portion 13 are made from a light-shielding material same as the inter-pixel 11l. The outer light-shielding portion 12 and the inner light-shielding portion 13 are subjected to patterning on the CF substrate 11a simultaneously with the light-shielding portion 11l using a known photo lithography method during patterning of the inter-pixel light-shielding portion 11l upon manufacturing of the CF substrate 11a. Consequently, the outer light-shielding portion 12 and the inner light-shielding portion 13 each have a film thickness substantially equal to that of the inter-pixel light-shielding portion 11l. The outer light-shielding portion 12 is disposed at the outer side of the display area AA, and almost the whole thereof overlaps the entire outer non-display area ONAA. The inner light-shielding portion 13 is disposed at the inner side of the display area AA, and almost the whole thereof overlap the entire inner non-display area INAA. In other words, the inner light-shielding portion 13 is annular and surrounds the opening 11H of the liquid crystal panel 11. As noted above, the outer light-shielding portion 12 and the inner light-shielding portion 13 are formed at substantially the same regions in the outer non-display area ONAA and the inner non-display area INAA. Consequently, the outer light-shielding portion 12 and the inner light-shielding portion 13 each have a frame shape of annular in plan view whose width dimension is sufficiently smaller than that of the display area AA. In addition, the outer light-shielding portion 12 and the inner light-shielding portion 13 are similar in shape. Moreover, an extending distance of the outer light-shielding portion 12 (circumferential dimension) is larger than that of the inner light-shielding portion 13. Note that FIG. 1 illustrates by hatch the regions where the outer light-shielding portion 12 and the inner light-shielding portion 13 are formed.

As illustrated in FIGS. 1, 4, and 5, spacers 30 are inserted between the paired substrates 11a, 11b, whereby an inner space (liquid crystal layer 11e) between the paired substrates 11a, 11b are kept with a constant thickness. The spacers 30 are selectively arranged in the outer non-display area ONAA and the inner non-display area INAA, and are not arranged at least in the display area AA. In other words, the outer non-display area ONAA and the inner non-display area INAA are a spacer arrangement region where the spacers 30 are arranged, and the display area AA is a non-spacer arrangement region where no spacer 30 is arranged. The spacers 30 include outer spacers 14 that are arranged in the outer non-display area ONAA and are superimposed on the outer light-shielding portion 12, and inner spacers 15 that are arranged in the inner non-display area INAA and are superimposed on the inner light-shielding portion 13. The outer spacers 14 and the inner spacers 15 that constitute the spacers 30 are cylindrical (columnar) that penetrate the liquid crystal layer 11e from a portion adjacent to the overcoat film 11m toward a portion adjacent to the array substrate 1ib on the CF substrate 11a. Moreover, the liquid crystal layer 11e has protruding tip ends that contact the alignment layer 11p adjacent to the array substrate 1ib opposite thereto. This allows a maintained given gap between the paired substrates 11a, 11b, i.e., a cell gap (the thickness of the liquid crystal layer 11e). The outer spacers 14 and the inner spacers 15 are made from a photosensitive resin material that is substantially transparent, for example, and are formed by patterning with a known photo lithography method during the manufacturing of the CF substrate 11a. Note that FIG. 1 illustrates the outer spacers 14 and the inner spacers 15 by dotted lines.

Specifically, as illustrated in FIGS. 1 and 4, the outer spacers 14 are arranged in an annular shape at intervals along an extending direction (circumferential direction) of the outer light-shielding portion 12. The inner spacers 15 are arranged in an annular shape at intervals along an extending direction of the inner light-shielding portion 13. The intervals in the circumferential direction between the adjacent outer spacers 14 and the intervals between the adjacent inner spacer 15 are each constant and substantially equal. Consequently, the arrangement number of the outer spacers 14 in the circumferential direction is larger than that of the inner spacers 15 in the same direction. Accordingly, the arrangement area of the inner spacers 15 is smaller than that of the outer spacers 14 in plan view.

As noted above in FIG. 1, the liquid crystal panel 11 includes the inner spacers 15 in addition to the outer spacers 14. Consequently, the maintained gap is obtainable between the paired substrates 11a, 11b at the outer and inner sides across the display area AA. This achieves an enhanced retaining force of the gap between the paired substrates 11a, 11b(substrate-gap retaining force) in comparison with the case where the outer spacers 14 are only disposed. In addition, the arrangement space of the outer spacers 14 becomes smaller in comparison with the case where the outer spacers 14 are enlarged in order to obtain the sufficient inter-substrate retaining force, leading to a narrowed frame. Moreover, the outer spacers 14 and the inner spacers 15, which may be a light shielding, are superimposed on the outer light-shielding portion 12 and the inner light-shielding portion 13, respectively, and are not superimposed on the display area AA. Consequently, such a situation as the lowered aperture ratio of the pixels PX is avoidable in the display area AA. This obtains effective usage of light from the back-light device. Therefore, achieved is high luminance of the image displayed on the display area AA or lowered power consumption by reducing a quantity of light supplied from the back-light device, leading to an advantage for obtaining high definition of the display area AA.

Especially, as illustrated in FIG. 1, the liquid crystal panel 11 according to the present embodiment includes the gate lines 11i and the source lines 11j arranged in the display area AA whose line width is smaller than the contours (diametric dimension) of the outer spacers 14 and the inner spacers 15 to achieve high definition. Consequently, if the outer spacers 14 and the inner spacers 15 are arranged on the inter-pixel light-shielding portion 11l in the display area AA, the outer spacers 14 and the inner spacers 15 partially protrude into the pixels PX and the circumferences thereof are light-shielded, which may lead to the lowered aperture ratio of the pixels PX. In contrast to this, when the outer light-shielding portion 14 and the inner light-shielding portion 15 overlap the outer light-shielding portion 12 and the inner shielding section 13, respectively, the lowered aperture ratio of the pixels PX is preventable in the liquid crystal panel 11 with improved high definition, leading to an advantage for obtaining the high definition.

Moreover, as illustrated in FIGS. 1, 4, and 5, the outer sealing portion 16 that overlaps the outer light-shielding portion 12 and the inner sealing portion 17 that overlaps the inner light-shielding portion 13 are inserted between the paired substrates 11a, 11b. As illustrated in FIGS. 1 and 4, the outer sealing portion 16 is annular that extends along the outer end face of the liquid crystal panel 11. The outer sealing portion 16 seals the liquid crystal layer 11e in the space between the paired substrates 11a, 11b over the entire periphery thereof from the outer circumference side. The outer sealing portion 16 has a width dimension smaller than that of the outer light-shielding portion 12, and smaller than a contour of the outer spacers 14. The outer sealing portion 16 is arranged in plan view so as to overlap the outer end face of the outer light-shielding portion 12, and so as not to overlap but to be adjacent to the outer spacers 14 at the outer side. As a result, the outer spacers 14 are arranged in plan view not to be superimposed on but to be adjacent to the outer sealing portion 16 at the inner circumference side. Note that FIG. 1 illustrates the outer sealing portion 16 and the inner sealing portion 17 by dotted lines.

As illustrated in FIGS. 1 and 5, the inner sealing portion 17 is annular that extends along the opening 11H of the liquid crystal panel 11. The outer sealing portion 16 seals the liquid crystal layer 11e in the space between the paired substrates 11a, 11b over the entire periphery thereof from the inner circumference side. The inner sealing portion 17 has a width dimension smaller than that of the inner light-shielding portion 13, and smaller than a contour of the inner spacers 15. The inner sealing portion 17 is arranged in plan view so as to overlap the inner end face of the inner light-shielding portion 13, and so as not to overlap but to be adjacent to the inner spacers 15 at the inner side (adjacent to the opening 11H). As a result, the inner spacers 15 are arranged in plan view so as not to be superimposed on but to be adjacent to the circumferential sealing portion 17 at the outer circumference side.

As described above, the liquid crystal panel (display device) 11 according to the embodiment of the present invention includes the paired substrates 11a, 11b bonded to each other, the outer light-shielding portion 12 disposed at the outer side of the display area AA where the image is displayed in the paired substrates 11a, 11b, the inner light-shielding portion 13 disposed at the inner side of the display area AA in the paired substrates 11a, 11b, the spacers 30 interposed between the paired substrates 11a, 11b, the outer spacers 14 constituting the spacers and superimposed on the outer light-shielding portion 12, and the inner spacers 15 constituting the spacers 30 and superimposed on the inner light-shielding portion 13.

With such a configuration, the image is displayed on the display area AA between the outer light-shielding portion 12 and the inner light-shielding portion 13 in the paired substrates 11a, 11b. The outer spacers 14 and the inner spacers 15 that constitute the spacers 30 are interposed between the paired substrates 11a, 11b, leading to the retained gap between the paired substrates 11a, 11b. As noted above, the inner spacers 15 are provided in addition to the outer spacers 14. Accordingly, the retained gap is obtainable between the paired substrates 11a, 11b at the outer and inner sides across the display area AA. This leads to an advantage for obtaining an enhanced retaining force between the substrates or obtaining a narrowed frame. Moreover, the outer spacers 14 and the inner spacers 15 that constitute the spacers 30, which may be the light shielding, are superimposed on the outer light-shielding portion 12 and the inner light-shielding portion 13, respectively. Consequently, this achieves prevention in reduction of the aperture ratio in the display area AA. This achieves high luminance of the image displayed on the display area AA or lowered power consumption, leading to an advantage for obtaining high definition of the display area AA.

Moreover, the spacers 30 are not disposed in at least the display area AA. The spacers 30, which may be the light-shielding, are not disposed in at least the display area AA in this manner described above. This ensures prevention of a lowered aperture ratio in the display area AA caused by the spacers 30.

Moreover, the paired substrates 11a, 11b have the openings 11H, respectively, formed so as to pass therethrough. The inner light-shielding portion 13 surrounds the openings 11H. With such a configuration, periphery portions of the openings 11H that are formed in the paired substrates 11a, 11b so as to pass through the substrates 11a, 11b are suitably shielded by the inner light-shielding portion 13.

Moreover, the display area AA includes the pixels PX. One of the paired substrates 11a, 11b includes the gate lines 11i and the source lines 11j (wiring part) whose line width is smaller than the contours of the outer spacers 14 and the inner spacer 15 and are connected to the pixels. When the contours of the outer spacer 14 and the inner spacer 15 are designed, it is needed to obtain the minimum dimensions for effectively producing the retaining force of the gap between the paired substrates 11a, 11b. In contrast to this, when the definition of the liquid crystal panel 11 becomes so high that a line width of the gate lines 11i and the source lines 11j connected to the pixels PX are smaller than the contours of the outer spacers 14 and the inner spacers 15, the spacers as the light-shielding may cause the lowered aperture ratio of the pixels PX even when the spacers are disposed within the display area AA to overlap the gate lines 11i and the source lines 11j. On the other hand, when the outer spacers 14 and the inner spacers 15 are superimposed on the outer light-shielding portion 12 and the inner light-shielding portion 13, respectively, as described above, the aperture ratio of the pixels PX is prevented from lowering even when the definition of the liquid crystal panel 11 becomes so high that the line width of the gate lines 11i and the source lines 11j connected to the pixels PX is smaller than the contours of the outer spacers 14 and the inner spacers 15. Accordingly, such provision as above is an advantage for obtaining the high definition.

Moreover, the arrangement area of the inner spacers 15 is smaller than the arrangement area of the outer spacers 14 in plan view. This allows the inner light-shielding portion 13 where the inner spacers 15 are superimposed on to be narrower than the outer light-shielding portion 12 where the outer spacers 14 are superimposed. This achieves the narrowed frame at the inner side of the display area AA. Consequently, a satisfied display quality is obtainable.

Second Embodiment

Figure 6:
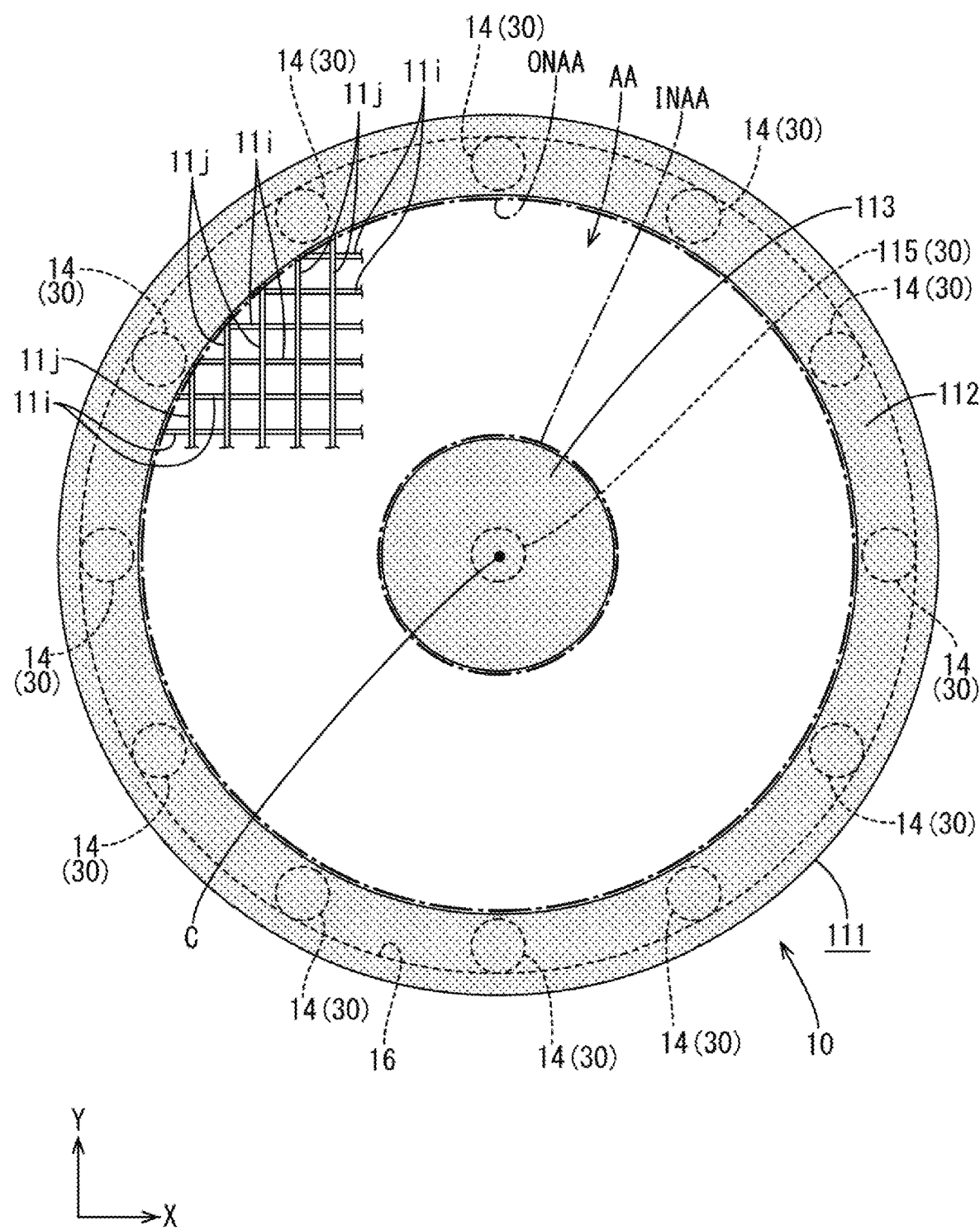
FIG. 6 is a schematic plan view of an internal configuration of a liquid crystal panel according to a second embodiment of the present invention.
Figure 7:
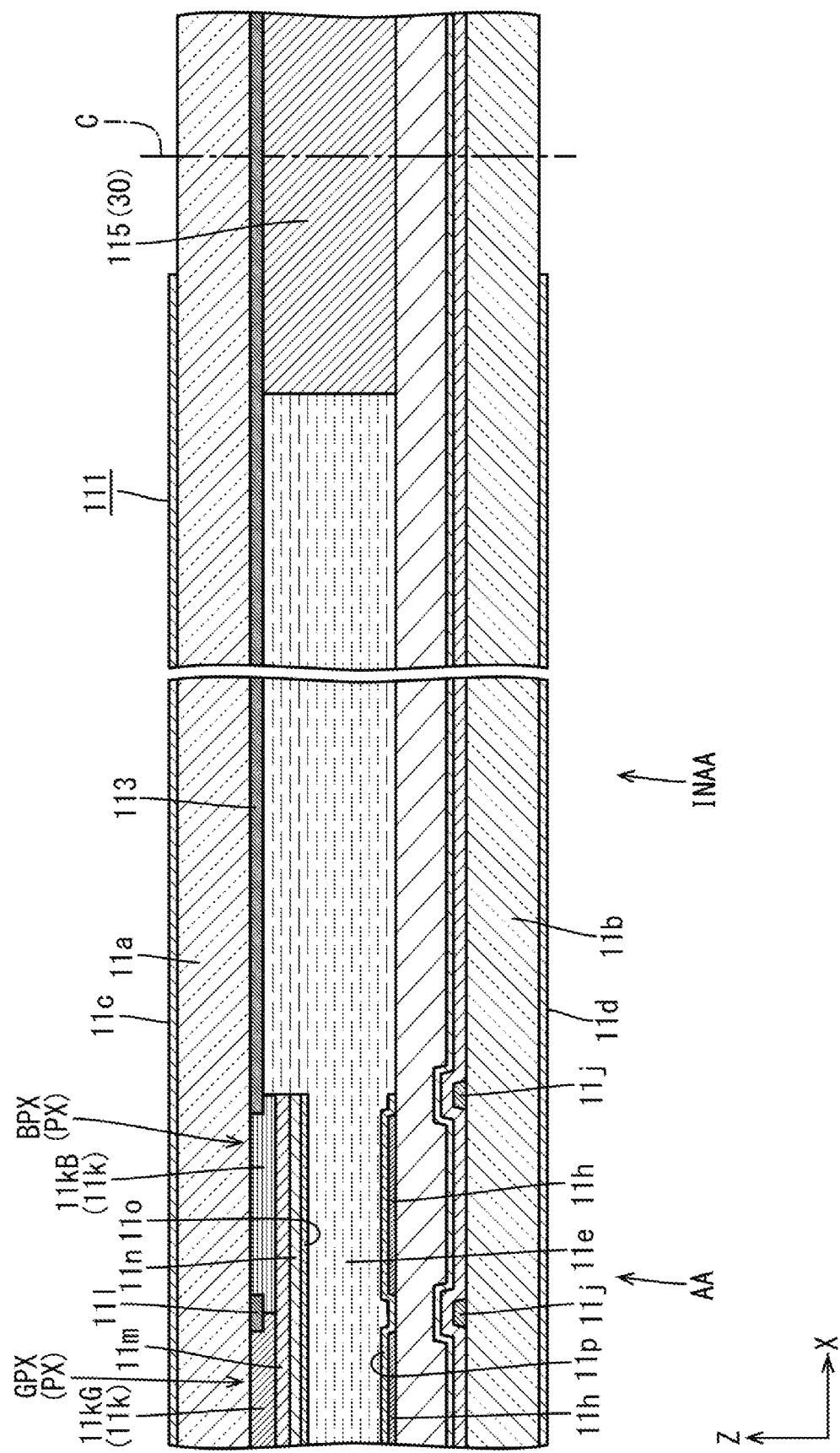
FIG. 7 is a sectional view of an inner side of the liquid crystal panel.

The following describes a second embodiment of the present invention with FIG. 6 or 7. In the second embodiment, a liquid crystal panel 11l with no opening is illustrated. Here, the description of the configuration and operational advantage common to that of the first embodiment is to be omitted.

As illustrated in FIGS. 6 and 7, paired substrates 111*a*, 111*b* that form the liquid crystal panel 111 according to the present embodiment has a non-opening plate shape without any of the openings 11H (see FIG. 5) described in the above first embodiment. Consequently, the liquid crystal panel 111 (the paired substrates 111*a*, 111*b*) is circular in planar shape, and has no circumferential sealing portion 17 (see FIG. 5) described in the above the first embodiment. Only one inner light-shielding portion 113 that is circular in planar shape overlap the center C of the paired substrates 111*a*, 111*b*. The inner light-shielding portion 113 shields a portion around the center C of the paired substrates 111*a*, 111*b* that are plate-shaped with no opening. In contrast to this, an outer light-shielding portion 112 is annular in plan view, which is similar to that in the first embodiment.

As illustrated in FIGS. 6 and 7, an inner spacer 115 is superimposed on the inner light-shielding portion 113, and is disposed concentrically with the paired substrates 111*a*, 111*b*. The portion around the center C of the paired substrates 111*a*, 111*b* is most likely to deform when an external force acts. On the other hand, the inner spacer is disposed concentrically with the center of the paired substrates 111*a*, 111*b* as described above. This leads to difficulty in deformation of the paired substrates 111*a*, 111*b* even when the external force acts, thereby obtaining a higher retaining force of a gap between the substrates 111*a*, 111*b*. The inner spacer 115 is similar in shape to the inner light-shielding portion 113. The sectional configuration of an outer side of the liquid crystal panel 111 according to the present embodiment is similar to that of the first embodiment in FIG. 4, and accordingly the description thereof is omitted.

According to the present embodiment as described above, the paired substrates 111*a*, 111*b* are each plate-shaped with no opening. The inner light-shielding portion 113 overlaps at least the center C of the paired substrates 111*a*, 111*b*. With such a configuration, the inner light-shielding portion 113 shields the portion around the center C of the plate-shaped paired substrates 111*a*, 111*b* with no opening.

Moreover, the inner spacer 115 is disposed concentrically with the paired substrates 111*a*, 111*b*. The portion around the center C of the paired substrates 111*a*, 111*b* is most likely to deform when an external force acts. On the other hand, the inner spacer 115 is disposed concentrically with the center of the paired substrates 111*a*, 111*b* as described above. This leads to difficulty in deformation of the paired substrates 111*a*, 111*b* even when the external force acts, thereby obtaining the higher retaining force of the gap between the substrates 111*a*, 111*b*.

Third Embodiment

Figure 8:
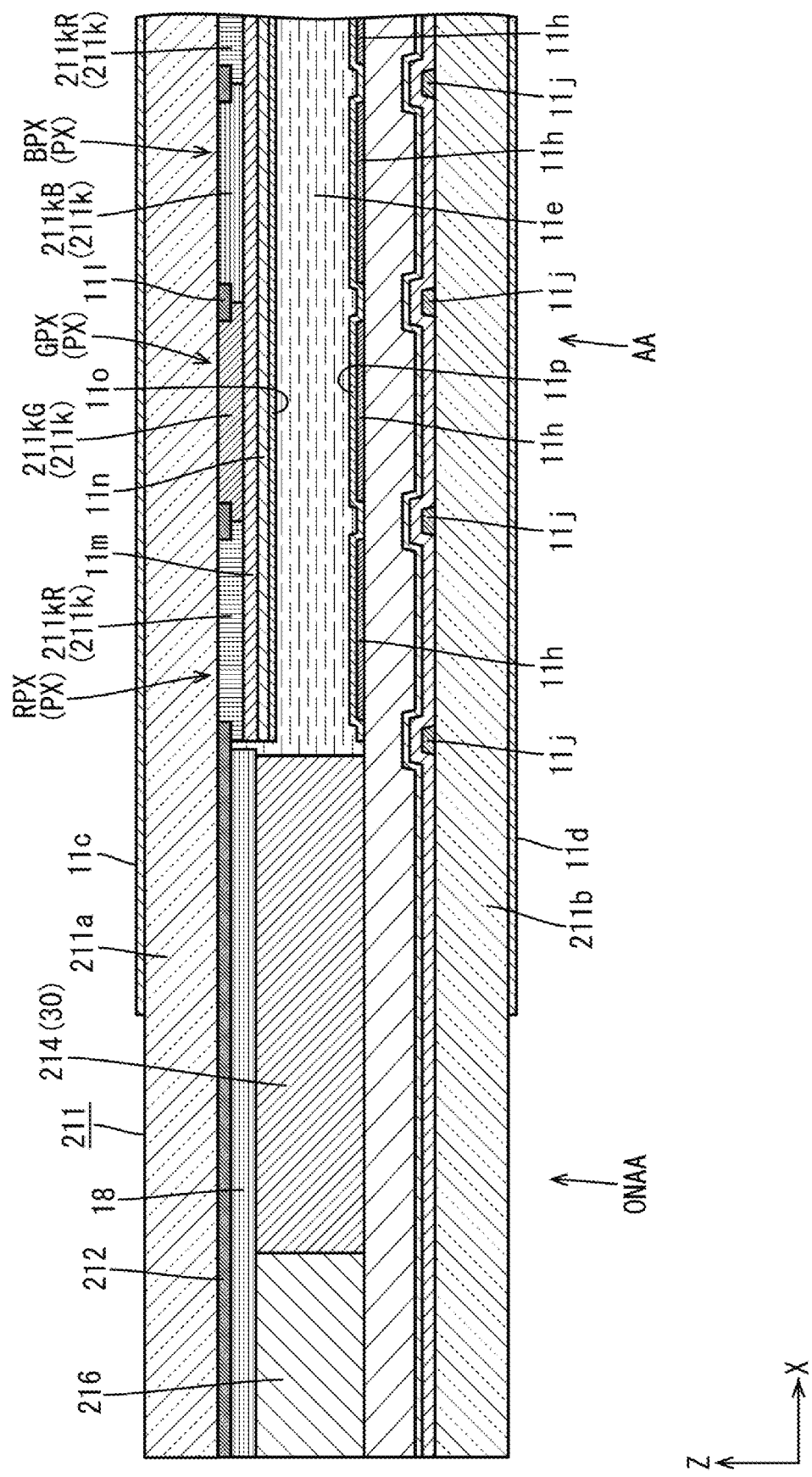
FIG. 8 is a sectional view of an outer side of a liquid crystal panel according to a third embodiment of the present invention.
Figure 9:
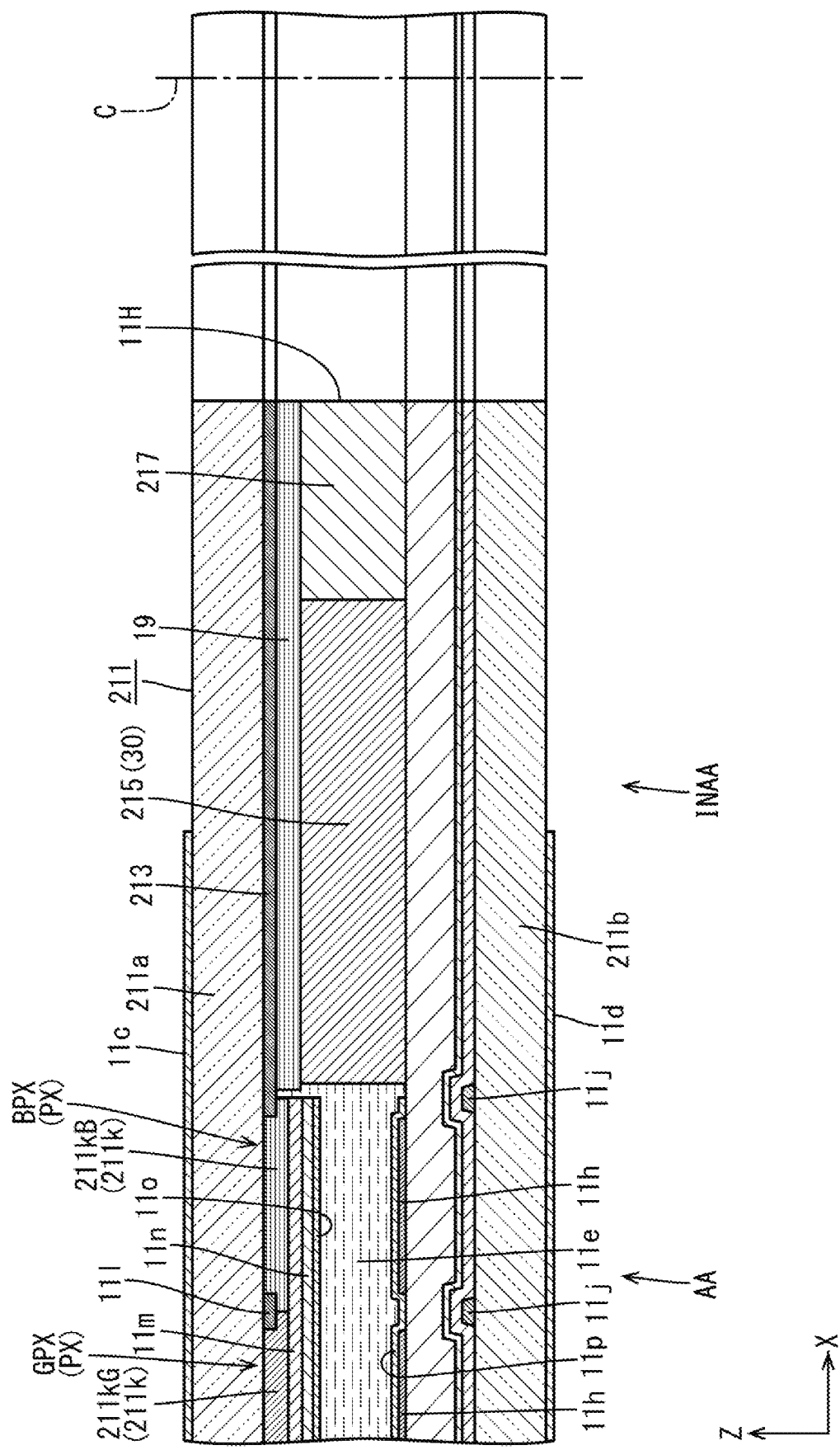
FIG. 9 is a sectional view of an inner side of the liquid crystal panel.

The following describes a third embodiment of the present invention with FIG. 8 or 9. In the third embodiment, an outer color filter 18 and an inner color filter 19 are added to the configuration of the first embodiment. Here, the description of the configuration and operational advantage common to that of the first embodiment is to be omitted.

As illustrated in FIGS. 8 and 9, a liquid crystal panel 211 according to the present embodiment includes an outer color filter (outer color section) 18 that is arranged in the same layer as the color filter 211*k* and overlaps outer spacers 214, and an inner color filter (inner color section) 19 that is arranged in the same layer as the color filter 211*k* and overlaps inner spacers 215. The outer color filter 18 and the inner color filter 19 are made from a material same as one of various color filters 211*k*R, 211*k*G, 211 kB in different colors contained in the color filter 211*k* in the display area AA. The outer color filter 18 and the inner color filter 19 are subjected to patterning on a CF substrate 211*a* simultaneously with the color filter 211*k* using a known photo lithography method during patterning of the color filter 211*k* upon manufacturing of the CF substrate 211*a*. Consequently, the outer color filter 18 and the inner color filter 19 each have a film thickness substantially equal to that of the color filter 211*k*. Here the present embodiment representatively illustrates the case where the outer color filter 18 and the inner color filter 19 are made from the material same as that of the blue color filter 211*k*B.

As illustrated in FIG. 8, the outer color filter 18 entirely overlaps an outer light-shielding portion 212, and its shape is annular, which is similar to the shape of the outer light-shielding portion 212. The outer color filter 18 overlaps outer spacers 214 at its inner circumference side, and overlaps the outer sealing portion 216 at its outer circumference side. As noted above, the outer color filter 18 overlaps the outer spacers 214 and the outer sealing portion 216, leading to reduced heights of the outer spacers 214 and the outer sealing portion 216 by a film thickness of the outer color filter 18. Moreover, the outer color filter 18 overlaps the outer light-shielding portion 212 in addition to the outer spacers 214, leading to prevention of visibility of the outer color filter 18.

As illustrated in FIG. 9, the inner color filter 19 entirely overlaps an inner light-shielding portion 213, and its shape is annular, which is similar to the shape of the inner light-shielding portion 213. The inner color filter 19 overlaps the inner spacers 215 at its outer circumference side, and overlaps the inner sealing portion 217 at its inner circumference side. As noted above, the inner color filter 19 overlaps the inner spacers 215 and the inner sealing portion 217, leading to reduced heights of the inner spacers 215 and the inner sealing portion 217 by a film thickness of the inner color filter 19. Moreover, the inner color filter 19 overlaps the inner light-shielding portion 213 in addition to the inner spacers 215, leading to prevention of visibility of the inner color filter 19.

According to the present embodiment described above, the display area AA includes the pixels PX. Moreover, included on one of the paired substrates 211*a*, 211*b* are the color filter (color section) 211*k* that colors the pixels PX, the outer color filter (outer color section) 18 that is arranged in the same layer as the color filter 211*k* and overlaps the outer spacers 214, and the inner color filter (inner color section) 19 that is arranged in the same layer as the color filter 211*k* and overlaps the inner spacers 215. With such a configuration, a height of the outer spacers 214 is capable of lowering by the thickness of the outer color filter 18 that overlaps the outer spacers 214. In addition, the height of the inner spacers 215 is capable of lowering by the thickness of the inner color filter 19 that overlaps the inner spacers 215. In addition, the outer color filter 18 overlaps outer light-shielding portion 212 in addition to the outer spacers 214. The inner color filter 19 overlaps the inner light-shielding portion 213 in addition to the inner spacer 215. This avoids visibility of the outer color filter 18 and the inner color filter 19.

Fourth Embodiment

Figure 10:
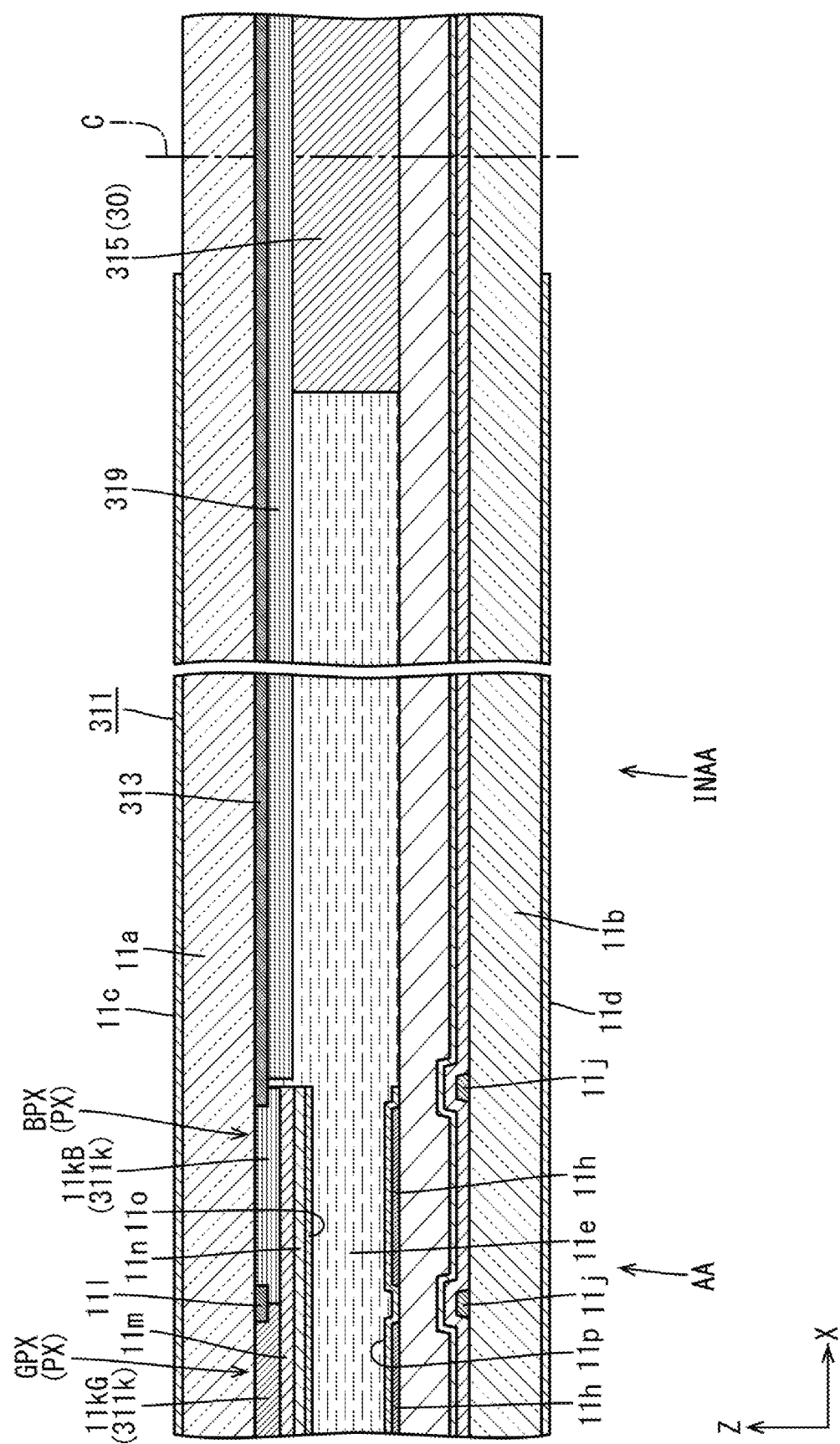
FIG. 10 is a sectional view of an inner side of a liquid crystal panel according to a fourth embodiment of the present invention.

The following describes a fourth embodiment of the present invention with FIG. 10. In the fourth embodiment, an outer color filter and an inner color filter 319 same in the third embodiment are added to the configuration of the second embodiment 2 described above. Here, the description of the configuration and operational advantage common to that of the second and third embodiments is to be omitted.

As illustrated in FIG. 10, a non-opening liquid crystal panel 311 according to the present embodiment includes an outer color filter (not shown with outer spacers) that is arranged in the same layer as the color filter 311k and overlaps the outer spacers, and an inner color filter 319 that is arranged in the same layer as the color filter 311k and overlaps an inner spacer 315. The sectional configuration of the liquid crystal panel 311 at the outer side (e.g., an outer color filter) according to the present embodiment is similar to that of the third embodiment in FIG. 8, and accordingly the description thereof is omitted.

The inner color filter 319 entirely overlaps an inner light-shielding portion 313, and its planar shape is circular, which is similar to the inner light-shielding portion 313. The inner color filter 319 overlaps the inner spacer 315 at its center portion side. As noted above, the inner color filter 319 overlaps the inner spacer 315, leading to a reduced height of the inner spacer 315 by a film thickness of the inner color filter 319. Moreover, the inner color filter 319 overlaps the inner light-shielding portion 313 in addition to the inner spacer 315, leading to prevention of visibility of the inner color filter 319.

Fifth Embodiment

Figure 11:
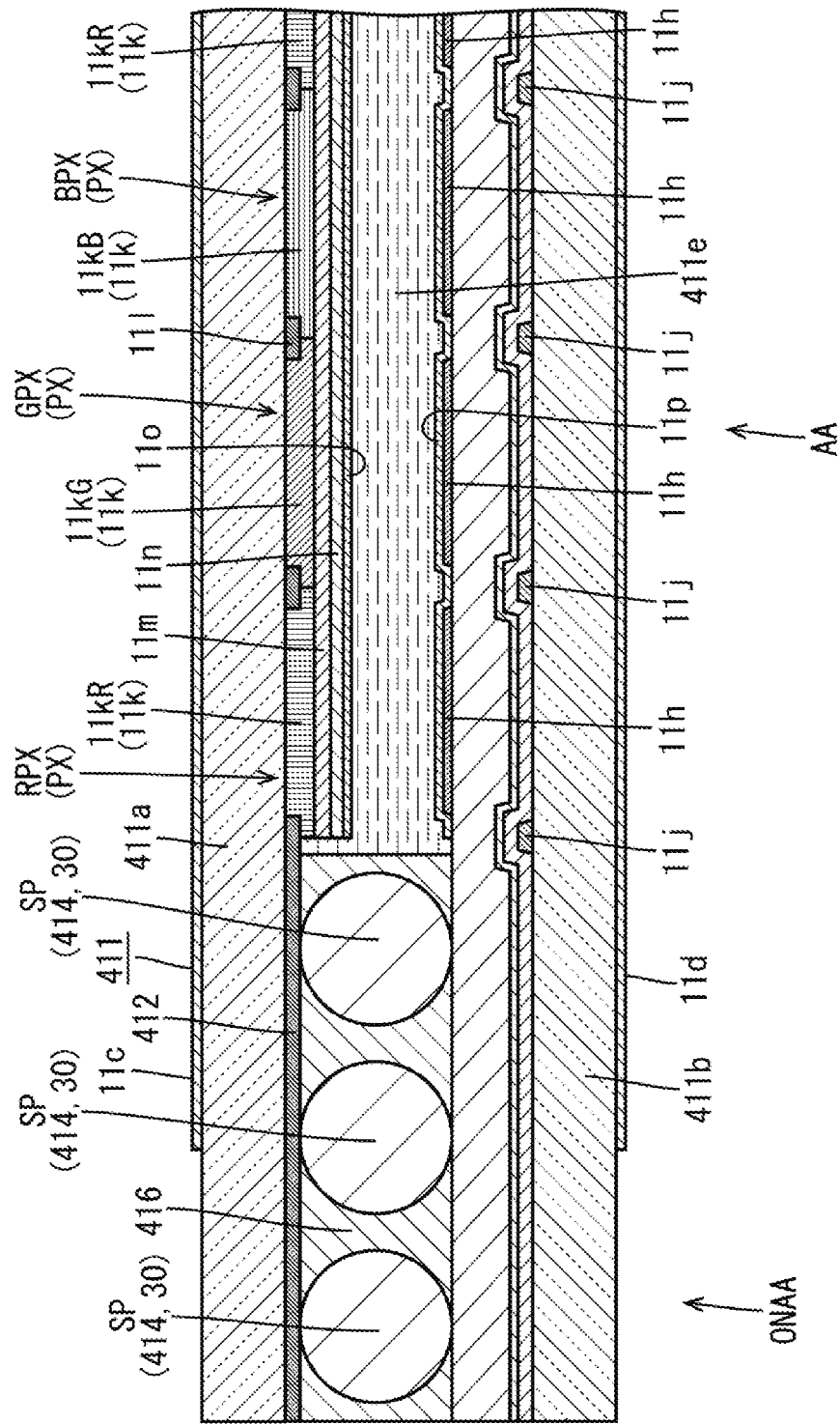
FIG. 11 is a sectional view of an outer side of a liquid crystal panel according to a fifth embodiment of the present invention.
Figure 12:
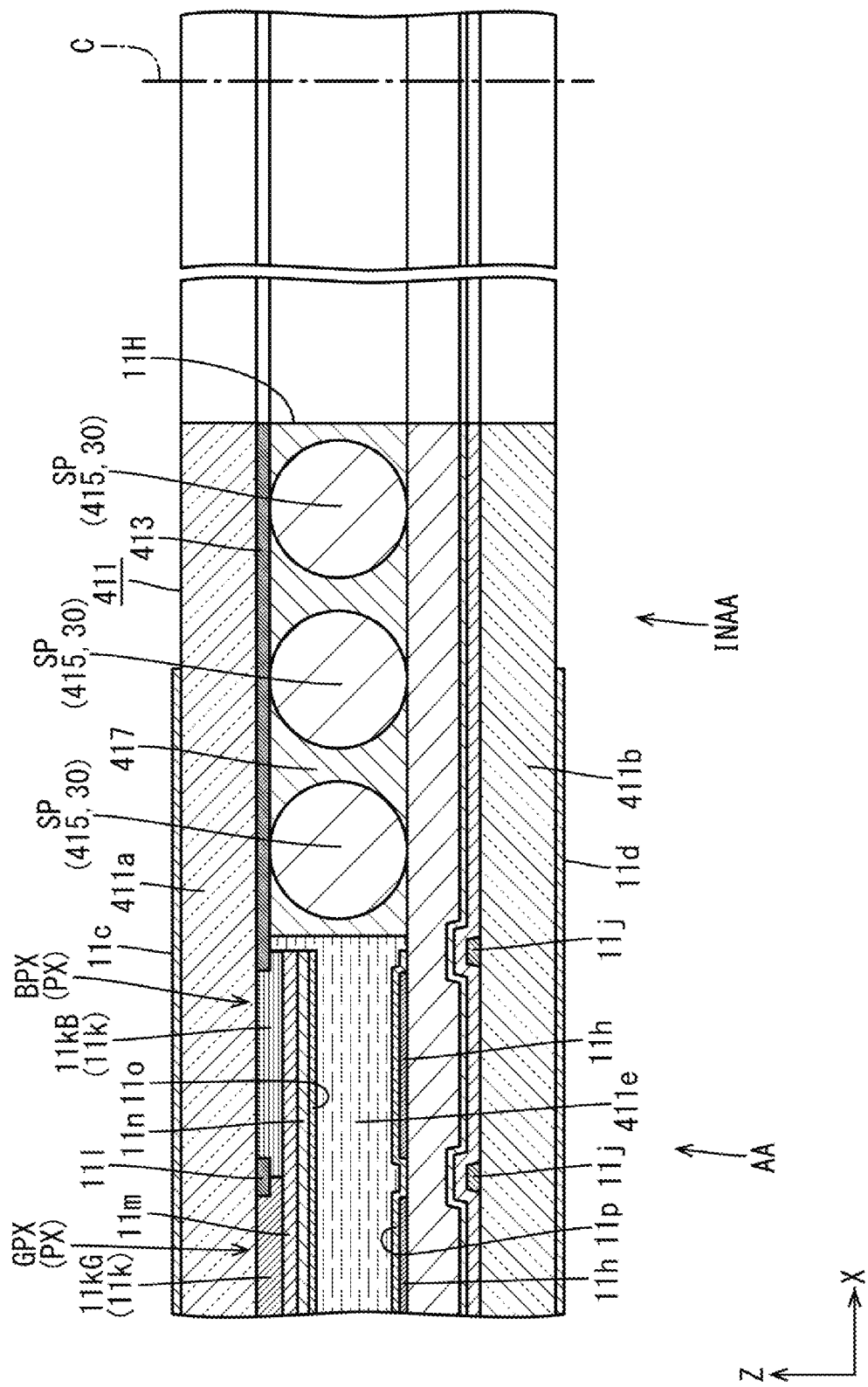
FIG. 12 is a sectional view of an inner side of the liquid crystal panel.

The following describes a fifth embodiment of the present invention with FIG. 11 or 12. In the fifth embodiment, illustrated are outer spacers 414 and inner spacers 415 that are obtained by changing the configuration and arrangement of the outer spacers and the inner spacers in the first embodiment described above. Here, the description of the configuration and operational advantage common to that of the first embodiment is to be omitted.

As illustrated in FIGS. 11 and 12, a liquid crystal panel 411 according to the present embodiment includes the outer spacers 414 and the inner spacers 415 that are superimposed on an outer sealing portion 416 and a circumferential sealing portion 417, respectively. Specifically, the outer spacers 414 and the inner spacers 415 are each formed by a plurality of spherical spacer particles SP. The spacer particles SP are made from synthetic resin, and many spacer particles SP are dispersed in the material of the outer sealing portion 416 and the circumferential sealing portion 417 at a given density. The spacer particles SP has a diametric dimension subsequently equal to a gap between paired substrates 411a, 411b, i.e. a cell gap (thickness of a liquid crystal layer 411a). The outer sealing portion 416 and the circumferential sealing portion 417 containing the spacer particles SP as above seal the gap between the paired substrates 411a, 411b at an outer side and an inner side, respectively, and keep the gap substantially constant. The spacer particles SP are dispersed two-dimensionally in regions where the outer sealing portion 416 and the circumferential sealing portion 417 are formed. For instance, the spacer particles SP are arranged in a width direction and a circumferential direction of the outer sealing portion 416 and the circumferential sealing portion 417. As described above, the outer spacers 414 and the inner spacers 415 overlap the outer sealing portion 416 and the circumferential sealing portion 417, respectively. Consequently, this achieves a narrow arrangement space of the outer spacers and the inner spacers, which is an advantage for obtaining the narrowed frame.

According to the present embodiment as described above, provided are the outer sealing portion 416, and the inner sealing portion 417. The outer sealing portion 416 is interposed between the paired substrates 411a, 411b to seal the paired substrates 411a, 411b and to overlap the outer light-shielding portion 412. The circumferential sealing portion 417 is interposed between the paired substrates 411a, 411b to seal the paired substrates 411a, 411b and to overlap the inner light-shielding portion 413. The outer spacers 414 overlap the outer sealing portion 416, and the inner spacers 415 are superimposed on the circumferential sealing portion 417. Accordingly, the outer sealing portion 416 and the inner sealing portion 417 are interposed between the paired substrates 411a, 411b, leading to sealing of the paired substrates 411a, 411b both the outer side and the inner side. The outer spacers 414 and the inner spacers 415 are superimposed on the outer sealing portion 416 and the circumferential sealing portion 417, respectively. Consequently, this achieves a narrow arrangement space of the outer spacers and the inner spacers, which is an advantage for obtaining the narrowed frame.

Sixth Embodiment

Figure 13:
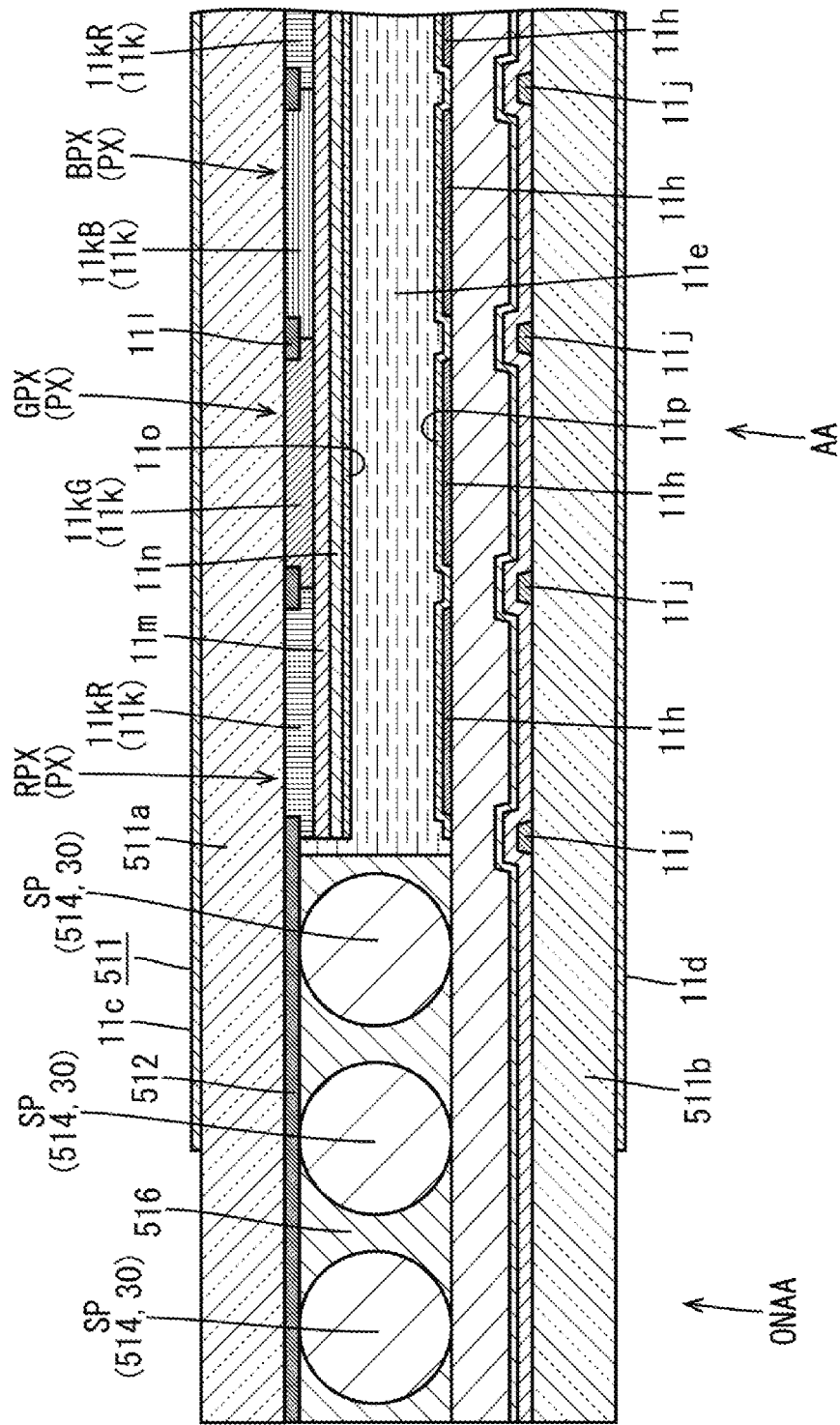
FIG. 13 is a sectional view of an outer side of a liquid crystal panel according to a sixth embodiment of the present invention.

The following describes a sixth embodiment of the present invention with FIG. 13. In the sixth embodiment, outer spacers 514 in the second embodiment are configured and arranged in the same manner as those in the fifth embodiment. Here, the description of the configuration and operational advantage common to that of the second and fifth embodiments is to be omitted.

As illustrated in FIG. 13, a non-opening liquid crystal panel 511 according to the present embodiment includes the outer spacers 514 that are superimposed on an outer sealing portion (sealing portion) 516. Specifically, many spacer particles SP that form the outer spacers 514 are dispersed in the material of the outer sealing portion 516. The outer sealing portion 516 containing the spacer particles SP as above seal a gap between paired substrates 511a, 511b at an outer side, and keep the gap substantially constant. As described above, the outer spacers 514 are superimposed on the outer sealing portion 516. Consequently, this achieves a narrow arrangement space of the outer spacers, which is an advantage for obtaining the narrowed frame. The sectional configuration of the inner side of the liquid crystal panel 511 (e.g., an inner spacer) according to the present embodiment is similar to that of the second embodiment in FIG. 7, and accordingly the description thereof is omitted.

According to the present embodiment as described above, provided is the outer sealing portion 516 that is interposed between the paired substrates 511a, 511b to seal the paired substrates 511a, 511b and to overlap the outer light-shielding portion 512. The outer spacers 514 are superimposed on the outer sealing portion 516. Accordingly, the outer sealing portion 516 is interposed between the paired substrates 511a, 511b, leading to sealing of the paired substrates 511a, 511b at the outer side. The outer spacers 514 are superimposed on the outer sealing portion 516. Consequently, this achieves a narrow arrangement space of the outer spacers, which is an advantage for obtaining the narrowed frame.

Seventh Embodiment

Figure 14:
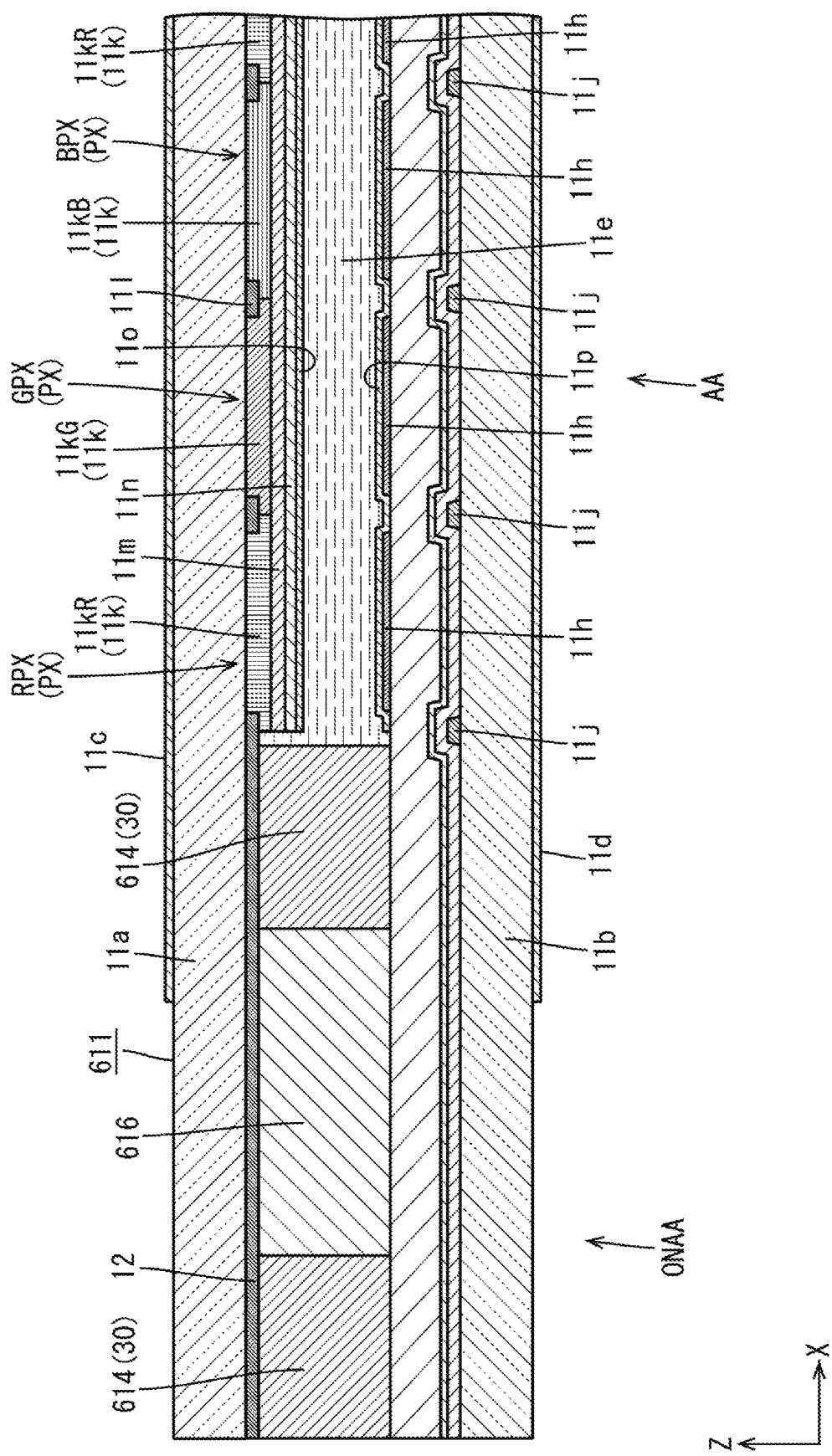
FIG. 14 is a sectional view of an outer side of a liquid crystal panel according to a seven embodiment of the present invention.
Figure 15:
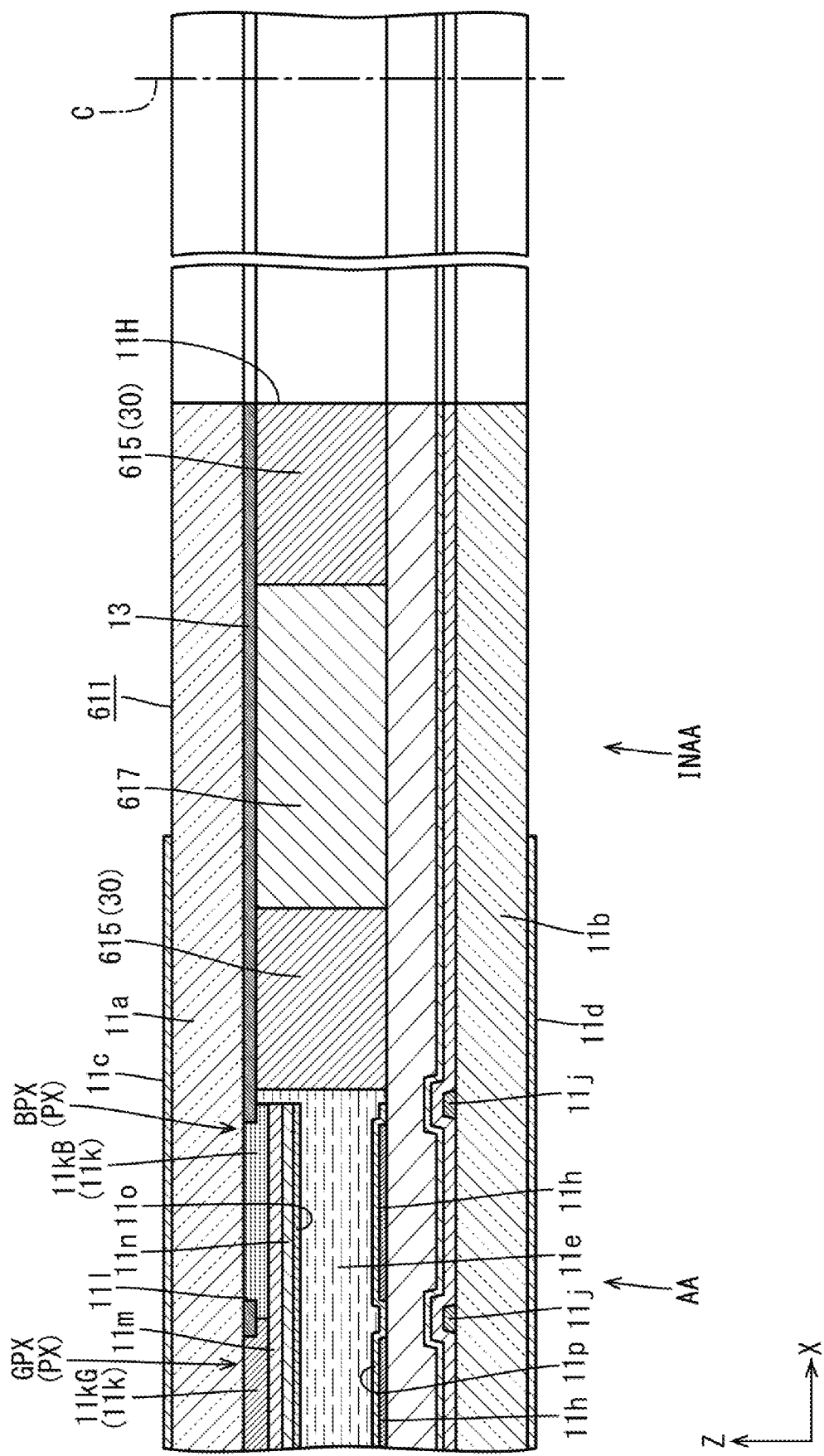
FIG. 15 is a sectional view of an inner side of the liquid crystal panel.

The following describes a seventh embodiment of the present invention with FIG. 14 or 15. In the seventh embodiment, illustrated are spacers 614, 615 and sealing portions 616, 617 that are obtained by changing the configuration and arrangement of the spacers and sealing portions in the first embodiment described above. Here, the description of the configuration and operational advantage common to that of the first embodiment is to be omitted.

As illustrated in FIGS. 14 and 15, a liquid crystal panel 611 according to the present embodiment includes outer spacers 614 and inner spacers 615 that are arranged adjacent to an outer sealing portion 616 and a circumferential sealing portion 617 at an outer side and an inner side, respectively, in pairs. Specifically, as illustrated in FIG. 14, the outer sealing portion 616 is arranged adjacent to the center in the width direction in the outer non-display area ONAA, whereas the paired outer spacers 614 are arranged on opposite ends in the width direction in the outer non-display area ONAA. That is, the paired outer spacers 614 sandwich the outer sealing portion 616 from the outer side and the inner side. As illustrated in FIG. 15, the inner sealing portion 617 is arranged adjacent to the center in the width direction in the inner non-display area INAA, whereas the paired inner spacers 615 are arranged on opposite ends in the width direction in the inner non-display area INAA. That is, the paired inner spacers 615 sandwich the inner sealing portion 617 from the outer side and the inner side.

Eighth Embodiment

Figure 16:
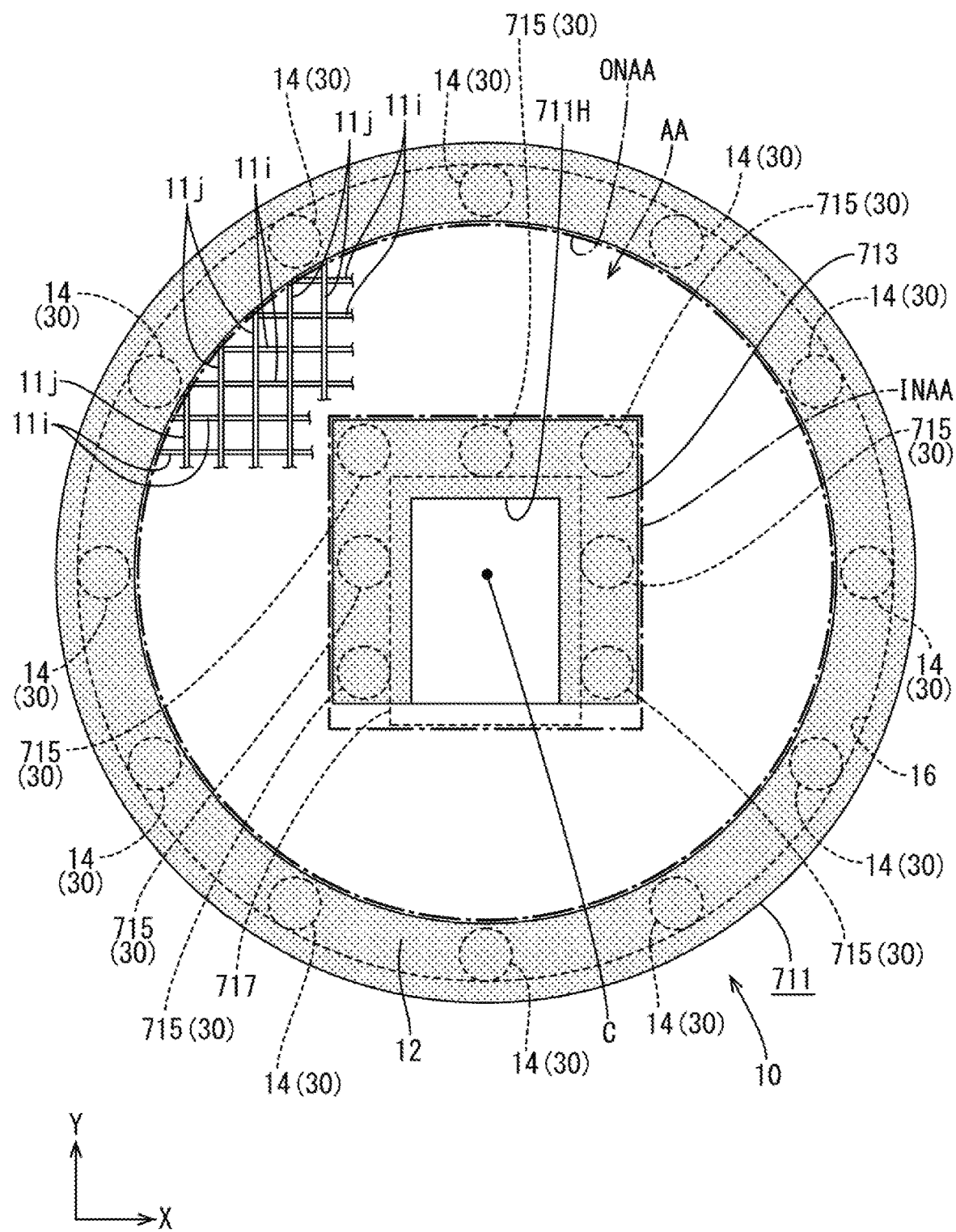
FIG. 16 is a schematic plan view of an internal configuration of a liquid crystal panel according to an eighth embodiment of the present invention.

The following describes an eighth embodiment of the present invention with FIG. 16. In the eighth embodiment, illustrated are a planar shape of an opening 711H and an inner light-shielding portion 713 as well as arrangement of inner spacers 715 obtained by changing those in the first embodiment described above. Here, the description of the configuration and operational advantage common to that of the first embodiment is to be omitted.

As illustrated in FIG. 16, an opening liquid crystal panel 711H that penetrates the liquid crystal panel 711 according to the present embodiment is rectangular in plan view. That is, the opening 711H has a planar shape different from a contour of the liquid crystal panel 711. Although the inner light-shielding portion 713 surrounds the opening 711H of the liquid crystal panel 711, the inner light-shielding portion 713 does not extend around the entire periphery of the opening 711H, but has an ended-annular shape in plan view. In other words, the inner light-shielding portion 713 extends along three of four sides that surround the opening 711H. A plurality of inner spacers 715 is arranged at intervals along an extending direction of the inner light-shielding portion 713 (along the three sides that surround the opening 711H). Similar to the first embodiment, the circumferential sealing portion 717 surrounds the entire periphery of the opening 711H.

Other Embodiment

The present invention is not limited to the embodiments described above with the description and the drawings. Such embodiments as under are contained in the technical scope of the present invention.

(1) Except the embodiments described above, the arrangement, the number, the planar shape, the size of the outer spacers in the outer light-shielding portion are appropriately variable. For instance, the following is applicable: the outer spacers may be arranged at unequal intervals in the circumferential direction of the outer light-shielding portion, or the outer spacers may be arranged only at the outer side of the outer sealing portion so as to be adjacent to one another. Moreover, the planar shape of the outer spacers may be variable to be oval or polygon.

(2) Except the embodiments described above, the arrangement, the number, the planar shape, the size of the inner spacers in the inner light-shielding portion are appropriately variable. For instance, the following is applicable: the inner spacer may be arranged at unequal intervals in the circumferential direction of the inner light-shielding portion, or the inner spacer may be arranged only at the inner side of the inner sealing portion so as to be adjacent to one another. Moreover, the planar shape of the inner spacer may be variable to be oval or polygon.

(3) In the first, third, fifth, and seventh embodiments described above, in the liquid crystal panel with the opening, the paired substrates and the opening have planar shapes that are each circular and similar to each other. Alternatively, the paired substrates and the opening may have planar shapes that are different from each other. For instance, the paired substrates may have the planar shape of circular, whereas the opening is variable to have the planar shape of other than circular (e.g., oval, or polygonal such as rhomboidal, triangle, pentagonal). Moreover, the opening may have the planar shape of circular, whereas the paired substrates are variable to have the planar shape of other than circular (e.g., oval, or polygonal such as triangle, pentagonal).

(4) In the first, third, fifth, and seventh embodiments described above, in the liquid crystal panel with the opening, the outer light-shielding portion and the inner light-shielding portion that have each an annular shape and similar to each other. Alternatively, the outer light-shielding portion and the inner light-shielding portion may have planar shapes that are different from each other. For instance, the outer light-shielding portion may have the planar shape of annular, whereas the inner light-shielding portion is variable to have the planar shape of other than annular (e.g., oval annular, or pentagonal annular). Moreover, the inner light-shielding portion may have the planar shape of annular, whereas the outer light-shielding portion is variable to have the planar shape of other than annular (e.g., oval annular, or pentagonal annular).

(5) For instance, in the second, fourth and sixth embodiments described above, the paired substrates have the planar shape of circular in the non-opening liquid crystal panel. Alternatively, the paired substrates may have a planar shape of other than circular (e.g., oval, or polygonal).

(6) For instance, in the second, fourth and sixth embodiments described above, the outer light-shielding portion have the planar annular shape in the non-opening liquid crystal panel. Alternatively, the outer light-shielding portion may have a planar shape of other than the annular shape (e.g., oval annular, or polygonal annular).

(7) For instance, in the second, fourth and sixth embodiments described above, the inner light-shielding portion has the planar circular shape in the non-opening liquid crystal panel. Alternatively, the inner light-shielding portion may have a planar shape of other than the circular shape (e.g., oval circular, or polygonal).

(8) In the second and fourth embodiments described above, one inner spacer in a columnar shape is arranged in the non-opening liquid crystal panel. Alternatively, a plurality of inner spacers in a columnar shape may be arranged in the non-opening liquid crystal panel.

(9) In the second and fourth embodiments described above, the inner spacer in the columnar shape is arranged in the non-opening liquid crystal panel concentrically with the paired substrates. Alternatively, although the inner spacer in the columnar shape is arranged on the non-opening liquid crystal panel so as to be superimposed on the center of the paired substrates, but may not necessarily be in concentric with the center of the paired substrates. Moreover, the inner spacer in the columnar shape may be arranged in the non-opening liquid crystal panel so as not to be superimposed on the center of the paired substrates.

(10) In the third and fourth embodiments described above, the outer color filter and the inner color filter are made from the material same as that of the blue color filter. Alternatively, the outer color filter and the inner color filter may be made from the material same as that of the red or green color filter.

(11) In the third and fourth embodiments described above, the outer color filter and the inner color filter are formed by the color filter with the same color. Alternatively, the outer color filter and the inner color filter may be formed by the color filters with different colors from each other.

(12) The configuration in the fifth embodiment described above may, off course, be combined with the configuration of the third embodiment (having the outer color filter and the inner color filter). Likewise, the configuration in the sixth embodiment described above may, off course, be combined with the configuration of the fourth embodiment.

(13) The configuration in the seventh embodiment described above may, off course, be combined with the configuration of the third embodiment (having the outer color filter and the inner color filter). Likewise, the configuration in the seventh embodiment described above may, off course, be combined with the configuration of the second and forth embodiments (non-opening liquid crystal panel).

(14) In the embodiments described above, the outer light-shielding portion and the inner light-shielding portion are disposed adjacent to the CF substrate. Alternatively, the outer light-shielding portion and the inner light-shielding portion may be disposed adjacent to the array substrate. Alternatively, the outer light-shielding portion and the inner light-shielding portion may be disposed on both the paired substrates.

(15) In the first to fourth and seventh embodiments 1 to 4 and 7 described above, the outer spacers and the inner spacers are described as columnar "photo spacers". Instead of this, the spacer particles as described in the fifth and sixth embodiments are adoptable. Moreover, in the fifth and sixth embodiments described above, the spacer particles are used as the outer spacers and the inner spacers. Instead of this, the columnar "photo spacers" as described in the first to fourth and seventh embodiments are adoptable.

(16) A dimensional relationship or a dimensional ratio among the lines, the spacers, and the light-shielding portions described in the embodiments and the drawings described above are appropriately variable.

(17) In the embodiments described above, the color filters (pixels) are formed by three colors of red, green, and blue as one example. The color filter with yellow color is adoptable in addition to the three colors of red, green, and blue. Moreover, the color filter may be formed by a colorless portion with no wavelength selectivity, in addition to the colors of red, green, and blue, that is capable of transmitting almost all visible radiation.

(18) In the embodiments described above, the liquid crystal panel is exemplarily described whose operation mode is displayed as a VA mode while the counter electrodes are arranged on the CF substrate. Alternatively, the present invention is applicable to the liquid crystal panel having other modes such as an in-plane switching (IPS) mode, and a fringe field switching (FFS) mode.

(19) In the embodiments described above, the liquid crystal panel is exemplarily described. Alternatively, the present invention is applicable to other types of panels such as a display panel (e.g., plasma display panel (PDP), an organic EL panel, an electrophoresis display panel (EPD), and a micro electro mechanical systems (MEMS) display panel).

(20) In the embodiments described above, a wearable terminal such as a smartwatch is exemplarily described as electronic equipment that uses the liquid crystal display device. Alternatively, the present invention is applicable to such a liquid crystal display device used for a smartphone, a tablet type notebook personal computer, a portable game console, and an instrument indication device for a transport such as an automobile.

(21) The configuration described in the eighth embodiment (the inner light-shielding portion in the ended-annular shape) is applicable to the configurations described in the first to seventh embodiments as above. In this case, in the configuration where the liquid crystal panel having the opening penetrating thereto (the first, third, fifth, and seventh embodiments), the paired substrates and the openings are similar in shape to each other. Alternatively, the paired substrates and the openings may be different from each other in shape. Moreover, the outer light-shielding portion and the inner light-shielding portion may be similar in planar shape to each other. Alternatively, the outer light-shielding portion and the inner light-shielding portion may be different from each other in planar shape.

(22) In the eighth embodiment described above, the liquid crystal panel whose contour is circular has the rectangular opening. Alternatively, the planar shape of the opening is variable to be one other than rectangular (e.g., rhomboidal, circular, oval, triangle, and polygon of pentagonal or more). Moreover, the paired substrates may have the planar shape other than the circular shape (e.g., oval, triangle, rectangular, and polygon of pentagonal or more).

EXPLANATION OF SYMBOLS

11, 111, 211, 311, 411, 511, 611, 711: liquid crystal panel (display device)
11*a*, 211*a*, 411*a*, 511*a*: CF substrate (substrate)
11*b*, 211*b*, 411*b*, 511*b*: array substrate (substrate)
11*i*: gate line (wiring part)
11*j*: source line (wiring part)
11*k*, 211*k*, 311*k*: color filter (color section)
11H, 711H: opening
12, 112, 212, 412, 512: outer light-shielding portion
13, 113, 213, 313, 413, 713: inner light-shielding portion
14, 214, 414, 514, 614: outer spacer
15, 115, 215, 315, 415, 615, 715: inner spacer
16, 216, 416, 516, 616: outer sealing portion (sealing portion)
17, 217, 417, 617: inner sealing portion
18: outer color filter (outer color section)
19, 319: inner color filter (inner color section)
30: spacer
AA: display area
C: center portion
PX: pixel

The invention claimed is:

1. A display device comprising: a first substrate including an outer non-display area, an inner non-display area, and a display area, the outer non-display area being along an outer edge of the first substrate, the inner non-display area being at a center of the first substrate, the display area being between the outer non-display area and the inner non-display area; a second substrate behind the first substrate and bonded to the first substrate with a space between the first substrate and the second substrate; an outer light-shielding member between the first substrate and the second substrate, the outer light-shielding member being located on a back surface of the first substrate in the outer non-display area; an inner light-shielding member between the first substrate and the second substrate, the inner light-shielding member being located on the back surface of the first substrate in the inner non-display area; spacers between the first substrate and the second substrate, the spacers including: outer spacers arranged at intervals along an inner edge of the outer light-shielding member on a back surface of the outer light-shielding member, and each of the outer spacers having a cylindrical column shape; and at least one inner spacer having a cylindrical column shape and located on a back surface of the inner light-shielding member, and the first substrate and the second substrate include through holes that communicate with each other, an outer sealing member located between the first substrate and the second substrate and extending along the outer edge of the first substrate to seal the space between the first substrate and the second substrate, and the outer sealing member is located on the back surface of the outer light-shielding member; and an inner sealing member located between the first substrate and the second substrate and extending along a hole edge of one of the through holes in the first substrate to seal the space between the first substrate and the second substrate, and the inner sealing member is located on the back surface of the inner light-shielding member, wherein the inner light-shielding member surrounds at least one of the through holes in the first substrate, the at least one inner spacer includes inner spacers disposed at intervals along an outer edge of the inner light-shielding member, the outer spacers are located between an inner edge of the outer sealing member and an inner edge of the outer light-shielding member, and the inner spacers are located between an outer edge of the inner sealing member and an outer edge of the inner light-shielding member.

2. The display device according to claim 1, wherein the spacers are not disposed in at least the display area.

3. The display device according to claim 1, further comprising a sealing member located between the first substrate and the second substrate to seal the space between the first substrate and the second substrate, the sealing member being located on the back surface of the outer light-shielding member, wherein
the outer spacers are located between an inner edge of the outer sealing member and an inner edge of the outer light-shielding member.

4. The display device according to claim 1, wherein the at least one inner spacer is arranged with a center of the at least one inner spacer concentric to a center of at least the first substrate.

5. The display device according to claim 1, further comprising:
pixels arranged in a section of the display device that includes the display area of the first substrate, and
electric lines having widths less than diameters of the outer spacers and the at least one inner spacer, the electric lines being connected to the pixels.

6. The display device according to claim 1, wherein the at least one inner spacer has a total cross-sectional area in a plan view less than a total cross-sectional area of the outer spacers in the plan view.

\* \* \* \* \*